US007997975B2

(12) United States Patent
Kojima

(10) Patent No.: US 7,997,975 B2

(45) **Date of Patent: *Aug. 16, 2011**

(54) SLOT MACHINE

(75) Inventor: Sakiko Kojima, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1104 days.

This patent is subject to a terminal disclaimer.

(21) Appl. No.: 11/808,257

(22) Filed: Jun. 7, 2007

(65) Prior Publication Data

US 2008/0045316 A1 Feb. 21, 2008

(30) Foreign Application Priority Data

Jun. 12, 2006 (JP) ................................. 2006-162186

(51) Int. Cl.
*G06F 17/00* (2006.01)

(52) U.S. Cl. ........................................................ 463/20

(58) Field of Classification Search ............... 463/16–25
See application file for complete search history.

(56) References Cited

U.S. PATENT DOCUMENTS 7,204,755 B2 * 4/2007 Seelig et al. .................... 463/16
2004/0009807 A1 * 1/2004 Miller et al. .................... 463/20
2005/0192073 A1 * 9/2005 Nakajima ........................ 463/16
2006/0287061 A1 * 12/2006 Inamura .......................... 463/20
2007/0032287 A1 * 2/2007 Osawa ............................ 463/16

FOREIGN PATENT DOCUMENTS

JP 2004-057221 A 2/2004

* cited by examiner

*Primary Examiner* — Ronald Laneau
(74) *Attorney, Agent, or Firm* — Arent Fox LLP

(57) ABSTRACT

A slot machine includes a symbol displaying device, a start switch, a display, and a controller. The controller is configured to implement a process including: (a) controlling the symbol displaying device; (b) determining whether or not symbols displayed in the symbol displaying device is entitled to a bonus game; (c) controlling a transition from a basic game to the bonus game if the controller determines that the symbols are entitled to the bonus game; (d) controlling the display to operate as a touch panel; and (e) executing a lottery to select one of first and second bonus game items with a selectable element selected by the player via the touch panel. The controller controls the payout given to the player according to the bonus game item selected in the lottery.

7 Claims, 16 Drawing Sheets

FIG. 10

PROBABILITY FOR WINNING AN AWARD IN A LOTTERY OF A BASIC GAME (RANGE OF RANDOM NUMBERS: 0 – 65535)

| AWARD | RANGE OF RANDOM NUMBERS | PROBABILITY OF WINNING AN AWARD |
|---|---|---|
| BONUS | 0 ~ 299 | 300 ／ 65536 |
| WILD | 300 ~ 300 | 1 ／ 65536 |
| SNAKE | 301 ~ 350 | 50 ／ 65536 |
| TREASURE BOX | 351 ~ 400 | 50 ／ 65536 |
| GOLD MASK | 401 ~ 450 | 50 ／ 65536 |
| HOLY GRAIL | 451 ~ 500 | 50 ／ 65536 |
| COMPASS AND MAP | 501 ~ 550 | 50 ／ 65536 |
| ACE | 551 ~ 1550 | 1000 ／ 65536 |
| KING | 1551 ~ 2550 | 1000 ／ 65536 |
| QUEEN | 2551 ~ 3550 | 1000 ／ 65536 |
| JACK | 3551 ~ 4550 | 1000 ／ 65536 |
| 10 | 4551 ~ 9999 | 5449 ／ 65536 |
| BLANK | 10000 ~ 65535 | 55536 ／ 65536 |

FIG. 11

SYMBOL ALLOCATION TABLE

| SYMBOL POSITION | SYMBOL | | | | |
|---|---|---|---|---|---|
| | 1st MECHANICAL REEL | 2nd MECHANICAL REEL | 3rd MECHANICAL REEL | 4th MECHANICAL REEL | 5th MECHANICAL REEL |
| 20 | BONUS | BONUS | BONUS | BONUS | BONUS |
| 19 | ACE | GOLD MASK | QUEEN | ACE | 10 |
| 18 | HOLY GRAIL | KING | KING | TREASURE BOX | SNAKE |
| 17 | TREASURE BOX | COMPASS | 10 | QUEEN | HOLY GRAIL |
| 16 | QUEEN | GOLD MASK | KING | KING | KING |
| 15 | 10 | QUEEN | TREASURE BOX | GOLD MASK | TREASURE BOX |
| 14 | HOLY GRAIL | HOLY GRAIL | HOLY GRAIL | BONUS | WILD |
| 13 | GOLD MASK | JACK | JACK | QUEEN | QUEEN |
| 12 | 10 | BONUS | BONUS | SNAKE | HOLY GRAIL |
| 11 | TREASURE BOX | HOLY GRAIL | TREASURE BOX | 10 | ACE |
| 10 | WILD | ACE | WILD | WILD | WILD |
| 9 | JACK | QUEEN | COMPASS | 10 | ACE |
| 8 | GOLD MASK | WILD | ACE | BONUS | 10 |
| 7 | JACK | ACE | 10 | QUEEN | TREASURE BOX |
| 6 | HOLY GRAIL | JACK | JACK | COMPASS | GOLD MASK |
| 5 | TREASURE BOX | KING | HOLY GRAIL | QUEEN | 10 |
| 4 | ACE | TREASURE BOX | TREASURE BOX | KING | TREASURE BOX |
| 3 | QUEEN | ACE | WILD | QUEEN | JACK |
| 2 | COMPASS | HOLY GRAIL | TREASURE BOX | HOLY GRAIL | COMPASS |
| 1 | 10 | TREASURE BOX | KING | ACE | TREASURE BOX |
| 0 | KING | QUEEN | TREASURE BOX | QUEEN | GOLD MASK |

FIG. 12

PAYOUT TABLE FOR AN AWARD OF A BASIC GAME

| AWARD | NUMBER OF COINS PAID OUT | | |
|---|---|---|---|
| | CREDIT NUMBER 1 | CREDIT NUMBER 2 | CREDIT NUMBER 3 |
| BONUS | 0 | 0 | 0 |
| WILD | 50 | 100 | 150 |
| SNAKE | 30 | 60 | 90 |
| TREASURE BOX | 25 | 50 | 75 |
| GOLD MASK | 20 | 40 | 60 |
| HOLY GRAIL | 15 | 30 | 45 |
| COMPASS AND MAP | 10 | 20 | 30 |
| ACE | 5 | 10 | 15 |
| KING | 4 | 8 | 12 |
| QUEEN | 3 | 6 | 9 |
| JACK | 2 | 4 | 6 |
| 10 | 1 | 2 | 3 |

FIG. 14(1)
(EXAMPLE 1 OF DISPLAY)
(1) (POWER COUNT N: 15)
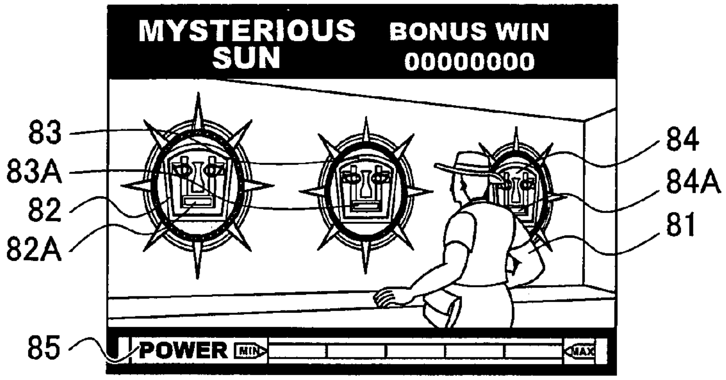
FIG. 14(2)
(EXAMPLE 1 OF DISPLAY)
(2) (POWER COUNT N: 3)
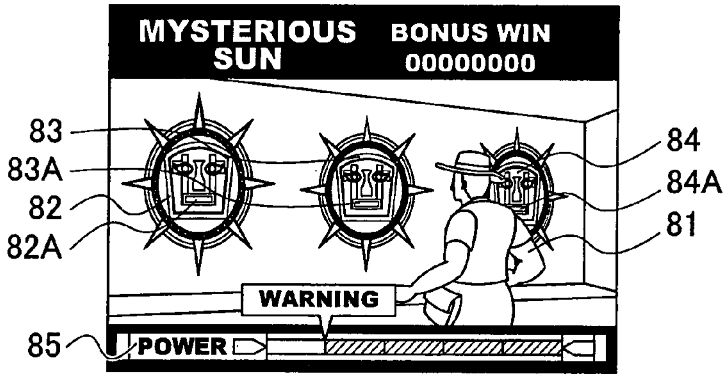
FIG. 15
PROBABILITY FOR WINNING AN AWARD IN A LOTTERY OF A FREE GAME
(RANGE OF RANDOM NUMBERS: 0 - 65535)
| FREE GAME ITEM | RANGE OF RANDOM NUMBERS | PROBABILITY OF WINNING AN AWARD |
|---|---|---|
| TREASURE | 0 ~ 16383 | 16384 / 65536 |
| SCORPION | 16384 ~ 65535 | 49152 / 65536 |

(EXAMPLE 2 OF DISPLAY)

(POWER COUNT N: 15)

FIG. 17
(EXAMPLE 3 OF DISPLAY)
(POWER COUNT N: 3)
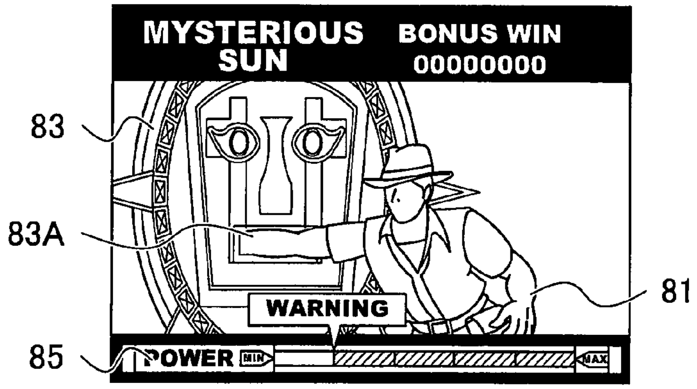
FIG. 18
PAYOUT TABLE FOR AN AWARD OF A FREE GAME
| FREE GAME ITEM | NUMBER OF COINS PAID OUT | SUBTRACTION VALUE FOR POWER COUNT |
|---|---|---|
| TREASURE | 100枚 | 0 |
| SCORPION | 10枚 | 3 |
FIG. 19
(EXAMPLE 4 OF DISPLAY)
(POWER COUNT N: 0)
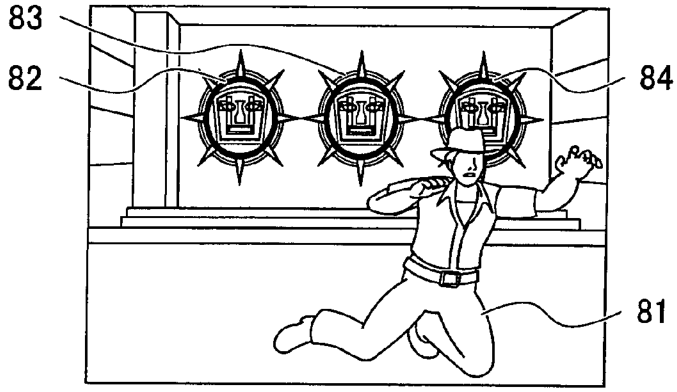

SLOT MACHINE

This application is based on and claims the benefit of priority from Japanese Patent Application No. 2006-162186, filed on 12 Jun. 2006, the content of which is incorporated herein by reference.

BACKGROUND OF THE INVENTION

1. Field of the Invention

The invention relates to a slot machine. More particularly, it relates to a slot machine which provides a player with a free game as a reward if a bonus trigger symbol or a combination including a bonus trigger symbol appears along a pay line, when the symbols in every column come to rest.

2. Related Art

Slot machines having a so-called free game have become popular recently. These slot machines provide the free game in order to increase the excitement of a player when a bonus trigger symbol or a combination of symbols including a bonus trigger symbol appears.

Patent Document No. 1 discloses a typical example of the slot machine described above.

The slot machine disclosed in Patent Document No. 1 performs a game prior to a free game so as to determine a payout given for the free game. The slot machine displays the determined payout.

Patent Document No. 1: Japanese Unexamined Patent Application Publication No. 2004-57221

However, the slot machine disclosed in Patent Document No. 1 internally determines the payout described above by an electronic lottery, such as one with random numbers. This means that the slot machine cannot give a player a chance to participate in the outcome of the lottery. Accordingly, the player may have a distrust of the payout given by the free game.

SUMMARY OF THE INVENTION

In view of the situation described above, the present invention has been made to provide a slot machine which is successful in releasing the player from distrust of the amount of game currency acquired in the free game.

The present inventor has conceived the idea that if the slot machine succeeds in letting the player feel that he or she virtually participates in the process for determining the amount of game currency to be acquired in the free game, the objective described above can be implemented.

A description is given in the following of the invention resulting from this idea.

In an aspect of the invention, a slot machine includes a symbol displaying device, a start switch, a display, and a controller. The symbol displaying device displays a plurality of symbols. The start switch receives an instruction for starting a basic game given by a player. The display displays an image of a character and a plurality of images of selectable elements. The controller is configured to implement a process including: (a) controlling the symbol displaying device; (b) determining whether or not the symbols displayed in the symbol displaying device are entitled to a bonus game; (c) controlling a transition from a basic gamer to the bonus game if the controller determines that the symbols are entitled to the bonus game; (d) controlling the display to operate as a touch panel; and (e) executing a lottery to select one of first and second bonus game items with a selectable element selected by the player via the touch panel. The controller controls the display to display an image of one of the first and second bonus game items, and controls one of first and second payouts in accordance with the outcome of the lottery.

As described above, the slot machine gives the player a chance to select a selectable element in the bonus game in response to a touching action applied to the touch panel by the player. The controller determines one of the bonus game items corresponding to high and low payouts with the selectable element selected by the player. Subsequently, the controller controls the payout in accordance with the resulting bonus game item. Accordingly, the slot machine can let the player feel that he or she is involved in making a decision on the amount of game currency acquired in the bonus game. In other words, although one of the high and low payouts is determined by the internal lottery which has been executed before one of the bonus game items appears on the display, the slot machine can let the player feel that his or her will be reflected on the payout of the bonus game.

It may be preferable, but is not necessary, that the second payout is smaller than the first payout, the controller controls the display to display an image indicating a capacity of the character in a predetermined dynamic fashion in accordance with the number of the second payout provided to the player, and the controller terminates the bonus game in accordance with the number of the second payout, and controls a transition from the bonus game to a basic game.

In the slot machine described above, the player can anticipate more easily if the controller is likely to control the transition of a bonus game to a basic game.

As examples of conveying the capacity of the character to the player during the bonus game, there are some different approaches. One is to let the player visually know the variation with the display, which displays the image of the character and the plurality of images of the selectable elements. Another is to let the player audibly know by giving an alert with a sound. Another is to let the player both visually and audibly know by a combination of the above-mentioned methods.

In addition, it may be possible to adopt different types of alternatives for the symbol displaying device. One is to use a plurality of mechanical reels. Symbols are on the circumferential surface of each mechanical reel, which is in motion or at rest. A component to provide mechanical motion implements dynamic and stationary states for each mechanical reel. Another is to use a display device on which a plurality of images of mechanical reels is virtually displayed. The display device is electrically controlled to dynamically and statically simulate the symbols.

The slot machine according to the invention can let a player feel that he or she partakes in determining the amount of game currency acquired in a bonus game.

BRIEF DESCRIPTION OF THE DRAWINGS

FIG. 10 is a table showing a probability for winning an award in a lottery of a basic game;

FIG. 11 is a table showing an allocation of symbols;

FIG. 12 is a table showing the amount of paid out game currency for a basic game;

FIG. 14(1) and FIG. 14(2) are schematic diagrams each illustrating an example of displaying on a liquid crystal display;

FIG. 15 is a table showing a probability for winning an award in a lottery of a free game;

FIG. 17 is a schematic diagram illustrating an example of displaying on the liquid crystal display;

FIG. 18 is a table showing the amount of paid out game currency for a free game;

FIG. 19 is a schematic diagram illustrating an example of displaying on the liquid crystal display.

DETAILED DESCRIPTION OF THE INVENTION

An embodiment of the invention is now described with reference to the drawings.

Figure 1:
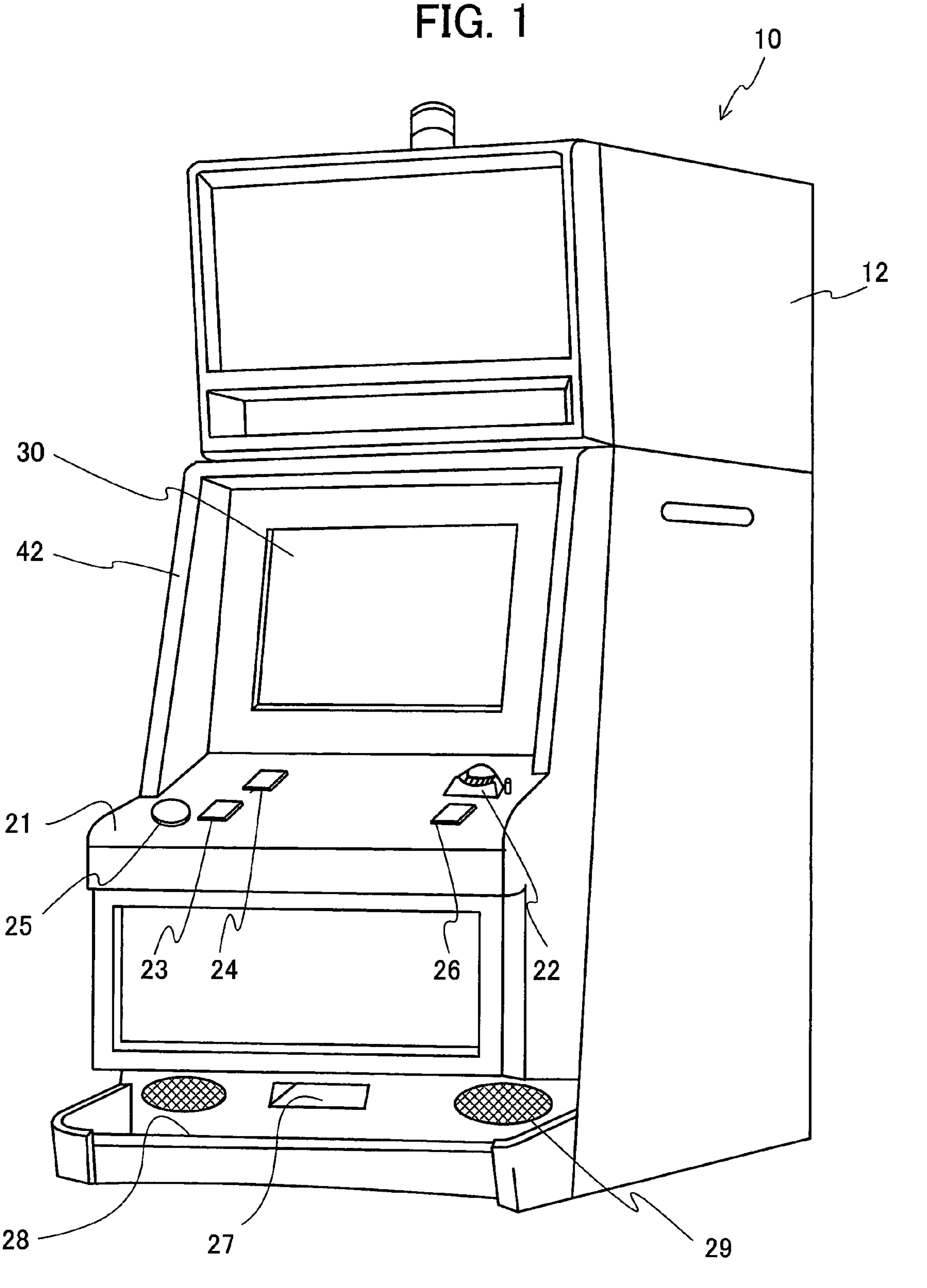
FIG. 1 is a perspective view illustrating an external appearance of a slot machine according to an embodiment of the invention.

As shown in FIG. 1, a slot machine 10 according to the embodiment includes a cabinet 12 and a main door 42.

The cabinet 12, which has a surface accessible by a player, is installed at a certain place of a casino. In the cabinet 12 there are various components, such as a controller 100 (see FIG. 7) and a hopper 44 (see FIG. 7). The controller 100 electrically controls the slot machine 10. The hopper 44 controls the insertion, storage and payout of coins (game currency).

The main door 42 covers the cabinet 12 so that the inside of the cabinet 12 is not seen from outside. The main door 42 is attached to a left side of the cabinet 12 about an axis as seen from front, so that the door 42 swings about the axis in the forward and backward directions and settles in one of selectable open and closed positions. A liquid crystal display 30 is disposed substantially in the center of the main door 42.

The liquid crystal display 30 displays various images associated with a game, including images of rendered effects and those for conveying information. A player proceeds with a game while looking at the various images displayed on the liquid crystal display 30. The liquid crystal display 30 has a transparent liquid crystal panel 34 (see FIG. 4 and FIG. 5). The liquid crystal panel 34 can be selectively switched between transparent and nontransparent modes for its partial or whole screen, and can also display various images. The liquid crystal display 30 will be described in more detail later.

Five mechanical reels 3A to 3E (see FIG. 2), each bearing a plurality of symbols on a circumferential surface, are rotatively disposed in a row on a rear side of the liquid crystal display 30. The mechanical reels 3A to 3E correspond to a symbol displaying device, displaying dynamically and statically a plurality of symbols including a bonus trigger symbol which are required for a basic game. When the transparent liquid crystal panel 34 is in a transparent mode, it is possible to see the symbols of the mechanical reels 3A to 3E.

A substantially flat operation panel 21 is disposed under the liquid crystal display 30. A coin insertion slot 22 for inserting coins into the slot machine 10 is disposed on the right side of the operation panel 21. On its left side are disposed a BET switch 23 and a spin repeat bet switch 24. A player uses the BET switch 23 to determine the number of coins bet on the nine effective pay lines to be described later. The player uses the spin repeat bet switch 24 so as to keep the number of bet coins for a subsequent game. In summary, pushing the one of the BET switch 23 and the spin repeat bet switch 24 determines the number of coins bet on the effective pay lines.

A start switch 25 is disposed on a left side of the BET switch 23 on the operation panel 21. At the start of each basic game the player uses the start switch 25. Pushing one of the start switch 25 and the spin repeat bet switch 24 triggers the start of game, starting the five mechanical reels 3A to 3E rotating.

A payout switch 26 is disposed adjacent to the BET switch 23 on the operation panel 21. When a player pushes the payout switch 26, coins in the slot machine 10 are paid out through a coin payout opening 27 into a coin tray 28. Sound outlets 29, through which effect sounds generated by speakers 41 (see FIG. 7) are conveyed to the outside of the cabinet 12, are disposed at both the right and left sides of the coin-payout opening 27 over the coin tray 28.

Figure 2:
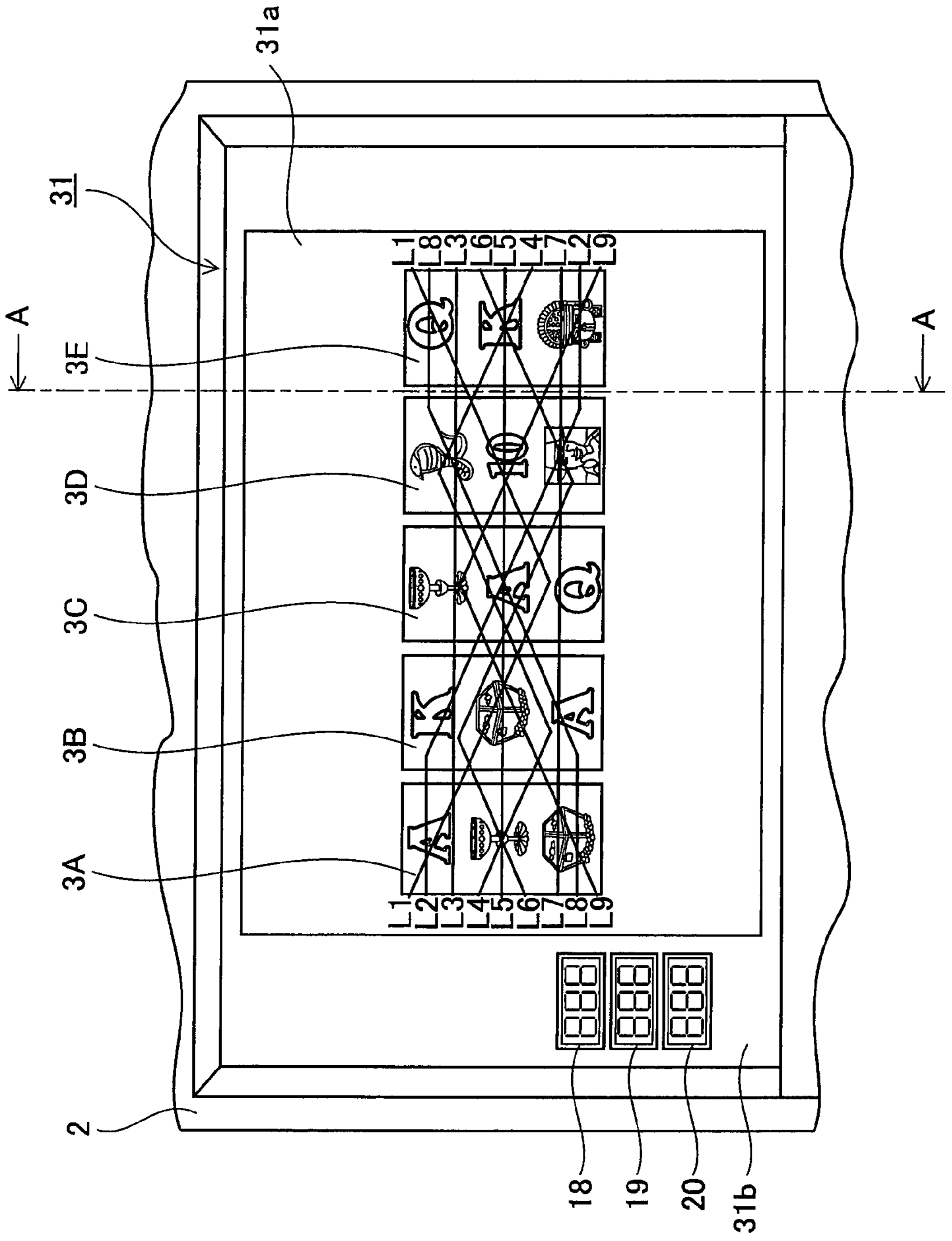
FIG. 2 is an enlarged front view illustrating a display area of the slot machine.

As shown in FIG. 2, the liquid crystal display 30 includes a front panel 31 and a transparent liquid crystal panel 34 (see FIG. 4 and FIG. 5) on a rear side of the front panel 31. The front panel 31 includes a transparent display surface 31*a* and a pattern area 31*b* on which patterns are drawn. It is possible to see image information, which is displayed on the transparent liquid crystal panel 34 disposed behind the front panel 31, through the display surface 31*a* of the front panel 31. On the other hand, when the transparent liquid crystal panel 34, which covers the front of the mechanical reels 3A to 3E, is in a transparent mode, it is possible to see symbols of the respective mechanical reels 3A to 3E through the display surface 31*a*.

Various displays such as a payout number display 18, a credit number display 19 and a BET number display 20 are disposed on the rear and left side of the liquid crystal display 30. In this connection, the pattern area 31*b* has transparent areas opposing to the various displays 18 to 20 so that contents they display are visible.

The slot machine 10 has nine pay lines L1 to L9 which are continuously made effective. Each of these pay lines L1 to L9 passes through one symbol for each of the mechanical reels 3A to 3E, when they all come to rest. Specifically, the first pay line L1 runs so that it passes through an upper symbol of the mechanical reel 3A, a middle symbol of the mechanical reel 3B, a lower symbol of the mechanical reel 3C, a middle symbol of the mechanical reel 3D, and an upper symbol of the mechanical reel 3E.

The second pay line L2 runs so that it passes through upper symbols of the mechanical reel 3A and the mechanical reel 3B, a middle symbol of the mechanical reel 3C, and lower symbols of the mechanical reel 3D and the mechanical reel 3E.

The fourth pay line L4 runs so that it passes through a middle symbol of the mechanical reel 3A, a lower symbol of the mechanical reel 3B, a middle symbol of the mechanical reel 3C, an upper symbol of the mechanical reel 3D, and a middle symbol of the mechanical reel 3E.

The sixth pay line L6 runs so that it passes through a middle symbol of the mechanical reel 3A, an upper symbol of the mechanical reel 3B, a middle symbol of the mechanical reel 3C, a lower symbol of the mechanical reel 3D, and a middle symbol of the mechanical reel 3E.

The eighth pay line L8 runs so that it passes through lower symbols of the mechanical reel 3A and the mechanical reel 3B, a middle symbol of the mechanical reel 3C, and upper symbols of the mechanical reel 3D and the mechanical reel 3E.

The payout number display 18 displays the number of coins to be paid out when a player wins an award. The credit number display 19 displays the number of coins stored in the slot machine 10 as credit. The BET number display 20 displays a BET number, which represents the number of coins bet on the effective lines described above. The displays 18 to 20 each include a seven-segment display. Alternatively, the liquid crystal display 30 can also display images on the transparent liquid crystal panel 34 in place of the displays 18 to 20.

Figure 3:
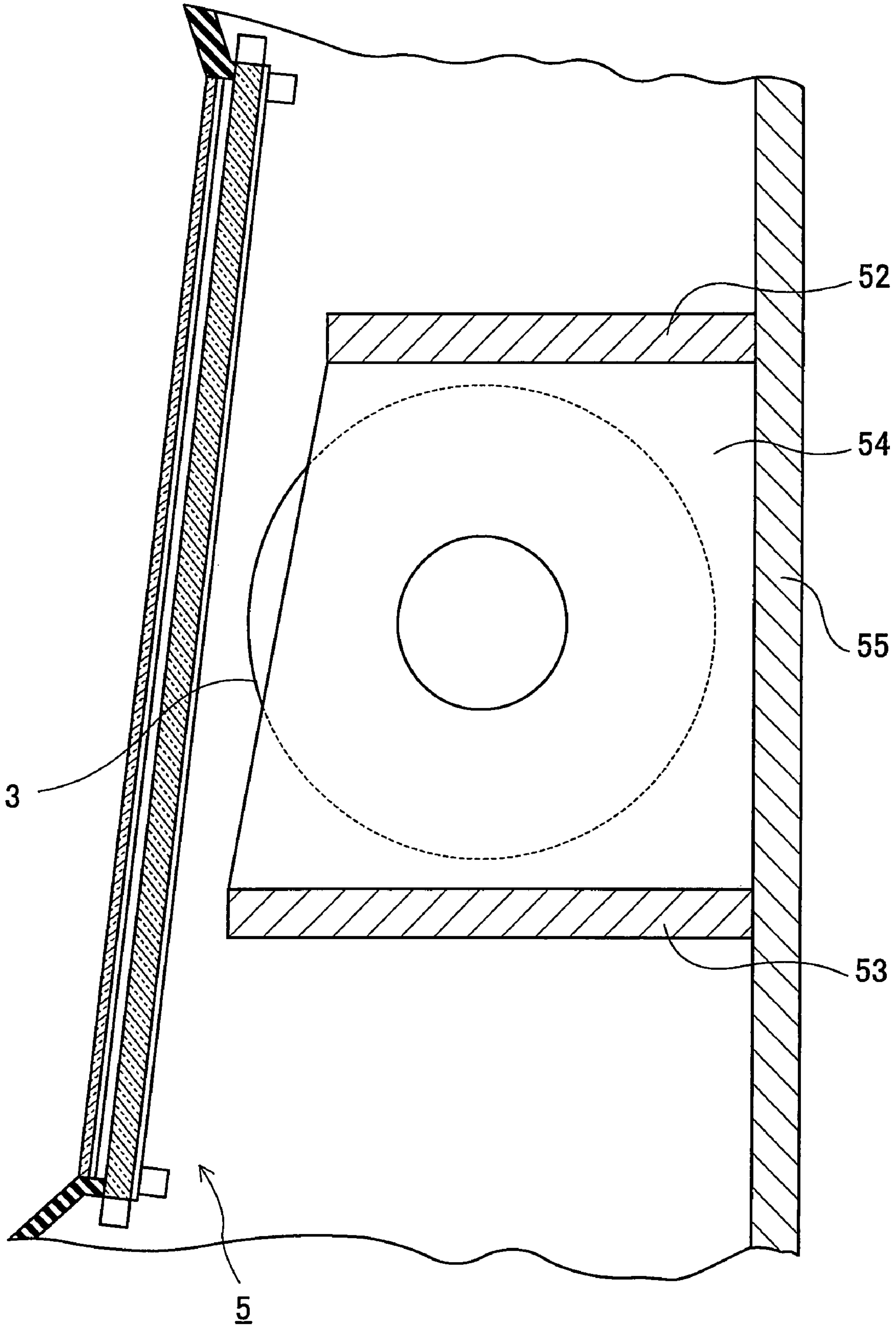
FIG. 3 is a sectional view taken along line A-A of FIG. 2.

FIG. 3 is a sectional view taken along line A-A of FIG. 2. Each of the mechanical reels 3A to 3E is individually rotatively supported by a reel frame 54. Though not shown, stepper motors 45A to 45E (to be described later) which rotate and stop the mechanical reels 3A to 3E are attached to the reel frame 54. The reel frame 54 is disposed between an upper frame 52 and a lower frame 53 which are attached to a main frame 55.

Figure 4:
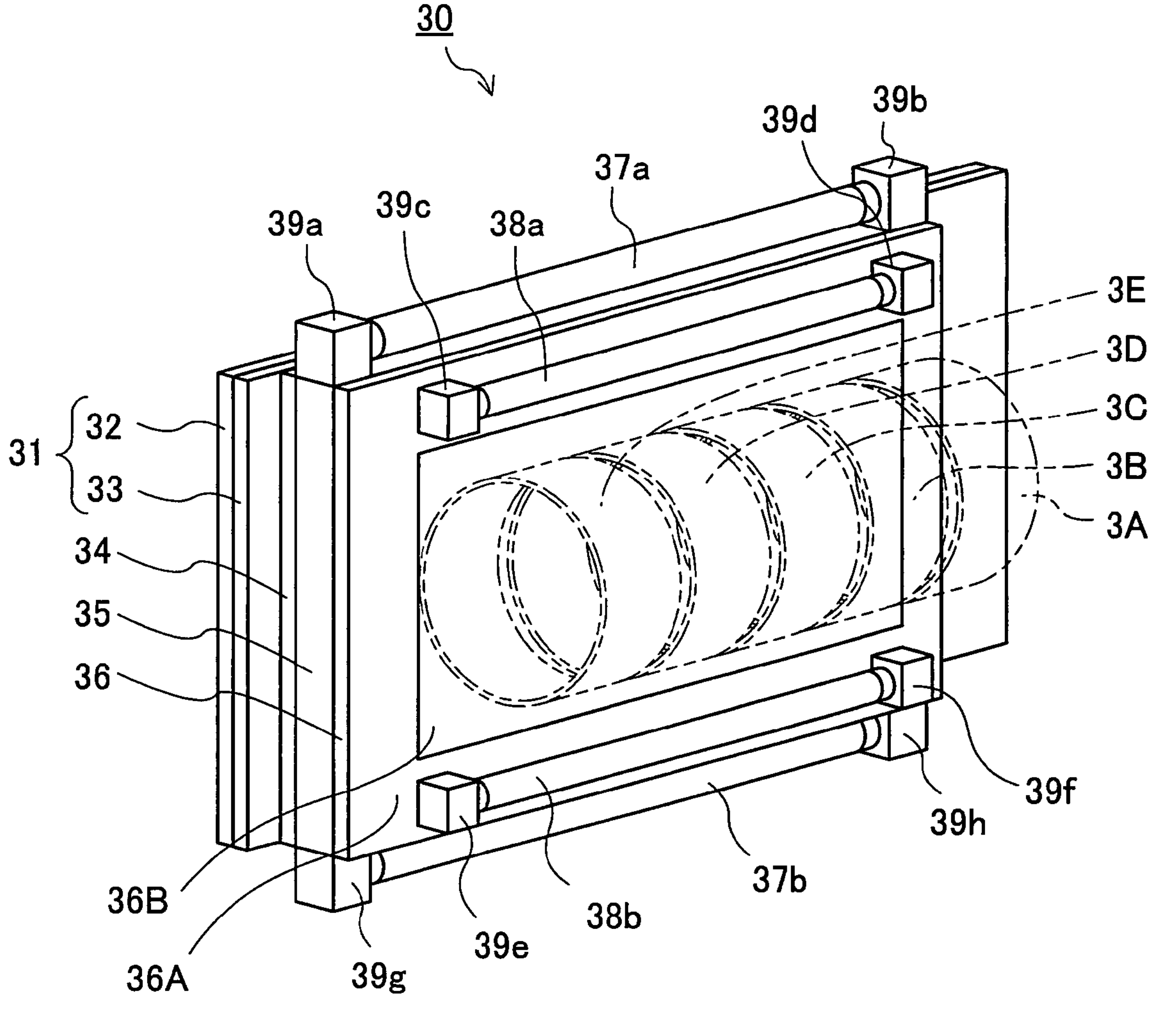
FIG. 4 is a perspective view showing an outline for a liquid crystal display of the slot machine as viewed from the rear.
Figure 5:
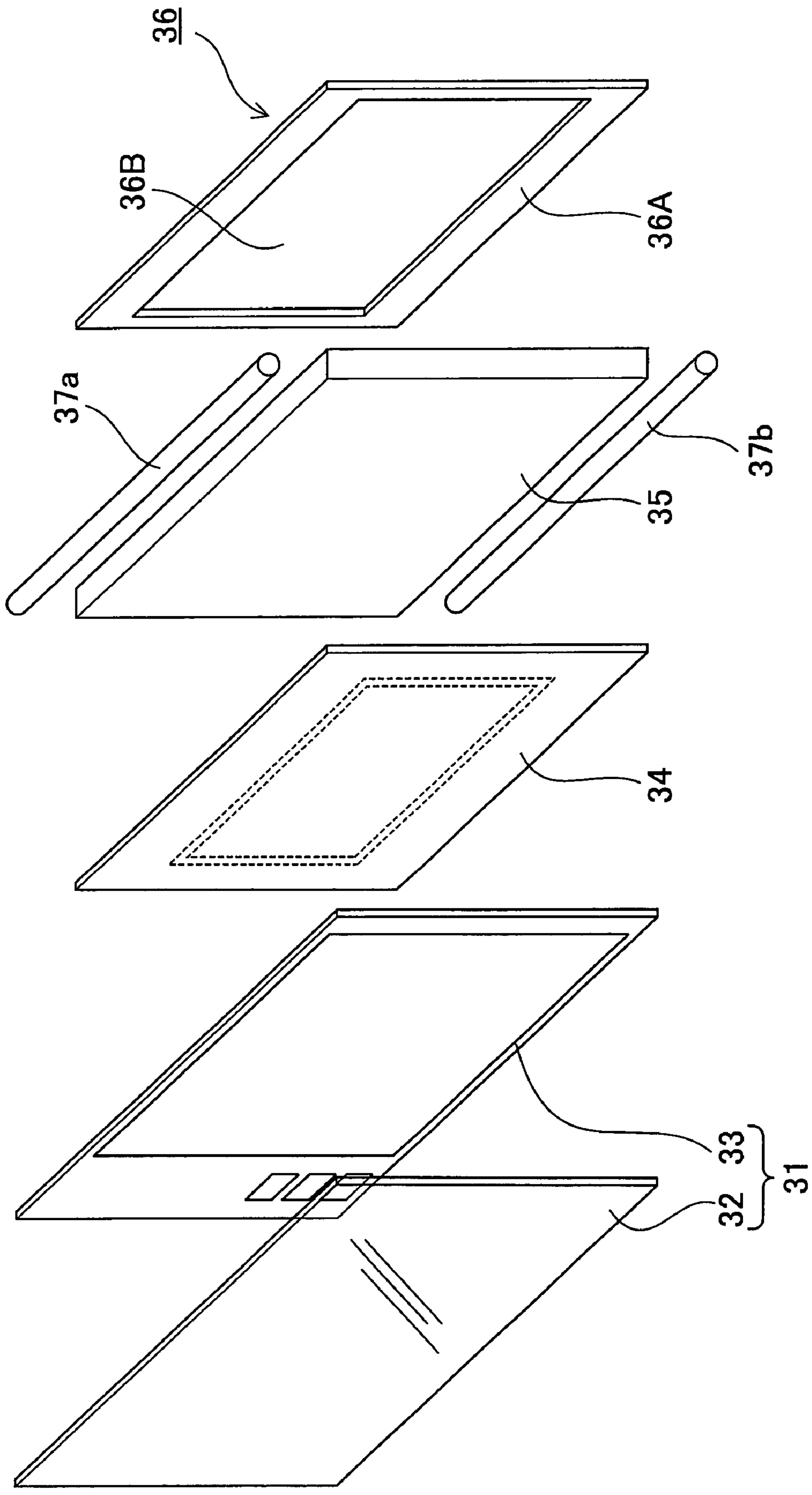
FIG. 5 is an exploded perspective view showing a portion of the liquid crystal display in FIG. 4.

As shown in FIG. 4 and FIG. 5, the liquid crystal display 30 includes a front panel 31 having a touch panel 32 and a display panel 33, a transparent liquid crystal panel 34, a light guiding panel 35, a reflective film 36, fluorescent lamps 37*a*, 37*b*, 38*a* and 38*b*, lamp holders 39*a*, 39*b*, 39*c*, 39*d*, 39*e*, 39*f*, 39*g* and 39*h*, and a table carrier package (TCP), on which an IC for driving the transparent liquid crystal panel 34 is mounted. It is noted that although not shown in FIG. 4 and FIG. 5, it may be possible for the TCP to include a flexible printed board (not shown) connected with terminals of the transparent liquid crystal panel 34.

Straddling the mechanical reels 3A to 3E, the liquid crystal display 30 is disposed in front of the display areas of the mechanical reels 3A to 3E (in front of the display surface 31*a*). Each of the mechanical reels 3A to 3E and the liquid crystal display 30 are spaced a predetermined distance apart.

The touch panel 32 is made of a transparent material. The display panel 33 is also made of a transparent material. Patterns and the like are laid out on the display panel 33 so as not to interfere with the various displays 18 to 20. In other words, the display panel 33 has a first area with the patterns and the like, which corresponds to the pattern area 31*b* of the front panel 31, and a second area without them corresponding to the display surface 31*a* (see FIG. 2). It may be alternatively possible to eliminate the pattern area 31*b* so that the display surface 31*a* occupies the whole surface of the front panel 31. In this case, it may be possible to select one of two approaches: one is to lay out no patterns on the display panel 33, and the other one is to eliminate the display panel 33.

It should be noted that electric circuits and the like which are disposed behind the display panel 33 to drive the various displays 18 to 20 are not shown in FIG. 4 or FIG. 5.

The transparent liquid crystal panel 34 includes a first transparent substrate such as a sheet of glass having a layer of thin film transistor, and a second transparent substrate opposing to the first substrate. A liquid crystal is encapsulated in the gap between the first and second substrates. A normally white mode is selected for the transparent liquid crystal panel 34 as a display mode. A normally white mode provides white display, in which light penetrating to the displaying side of the liquid crystal panel 34 is visible from outside, while the liquid crystal is not driven. The use of a liquid crystal panel 34 with a normally white mode allows a player to see the symbols of the respective mechanical reels 3A to 3E in dynamic and static modes in the case that the liquid crystal fails to be driven. Accordingly, this enables the player to continue enjoying a game in such an occasion. In other words, it is possible for the player to enjoy a game with the respective mechanical reels 3A to 3E in dynamic and static modes even if the failure described above occurs.

The light guiding plate 35 guides light coming from the fluorescent lamps 37*a* and 37*b* to the transparent liquid crystal panel 34, in other words, it illuminates the transparent liquid crystal panel 34. The light guiding plate 35 is disposed behind the transparent liquid crystal panel 34, and made of a transparent material, which allows light to pass through, such as a plate of acrylic resin having a thickness of 2 cm.

The reflective film 36, which is made of a silver-deposited white polyester film or a silver-deposited aluminum film, for example, reflects light introduced into the light guiding plate 35 towards the front of the light guiding plate 35. The reflective film 36 includes a reflective area 36A and a nonreflective area (light permeable area) 36B. The nonreflective area 36B made of a transparent material lies in an area of the front panel 31 which covers the front of the mechanical reels 3A to 3E.

The fluorescent lamps 37*a* and 37*b* are disposed along an upper end portion and a lower end portion of the light guiding plate 35, respectively. Both ends of respective lamps 37*a* and 37*b* are supported by a pair of lamp holders 39*a* and 39*b* and a pair of lamp holders 39*g* and 39*h*. The light cast by the fluorescent lamps 37*a* and 37*b* is reflected off the reflective area 36A of the reflective film 36 to illuminate the transparent liquid crystal panel 34. On the other hand, the fluorescent lamps 38*a* and 38*b* are disposed behind the reflective film 36 at an upper portion and a lower portion, respectively, so as to face the mechanical reels 3A to 3E. Both ends of respective lamps 38*a* and 38*b* are supported by a pair of lamp holders 39*c* and 39*d* and a pair of lamp holders 39*e* and 39*f*. The light cast by the fluorescent lamps 38*a* and 38*b* is reflected off the surfaces of the mechanical reels 3A to 3E to travel into the nonreflective area 36B, illuminating the transparent liquid panel 34. As described above, in the liquid crystal display 30, the light from the fluorescent lamps 37*a* and 37*b* as well as 38*a* and 38*b* simultaneously illuminates the transparent liquid crystal panel 34. In this way, one area of the liquid crystal display 30 corresponding to the nonreflective area 36B of the reflective film 36 has selectable transparent and nontransparent modes according to whether or not the liquid crystal is driven. In contrast, the other area of the liquid crystal display 30 corresponding to the reflective area 36A has only a nontransparent mode, regardless of whether the liquid crystal is driven.

Although the slot machine 10 described above has a partial portion of the display area of the liquid crystal display 30 for which transparent and nontransparent modes are selectively applicable, it may be alternatively possible to apply these modes to the whole portion. In order to implement this alternative case, it may be possible to adopt a reflective film 36 whose whole area is a nonreflective area 36B, or to eliminate the reflective film 36.

Figure 6:
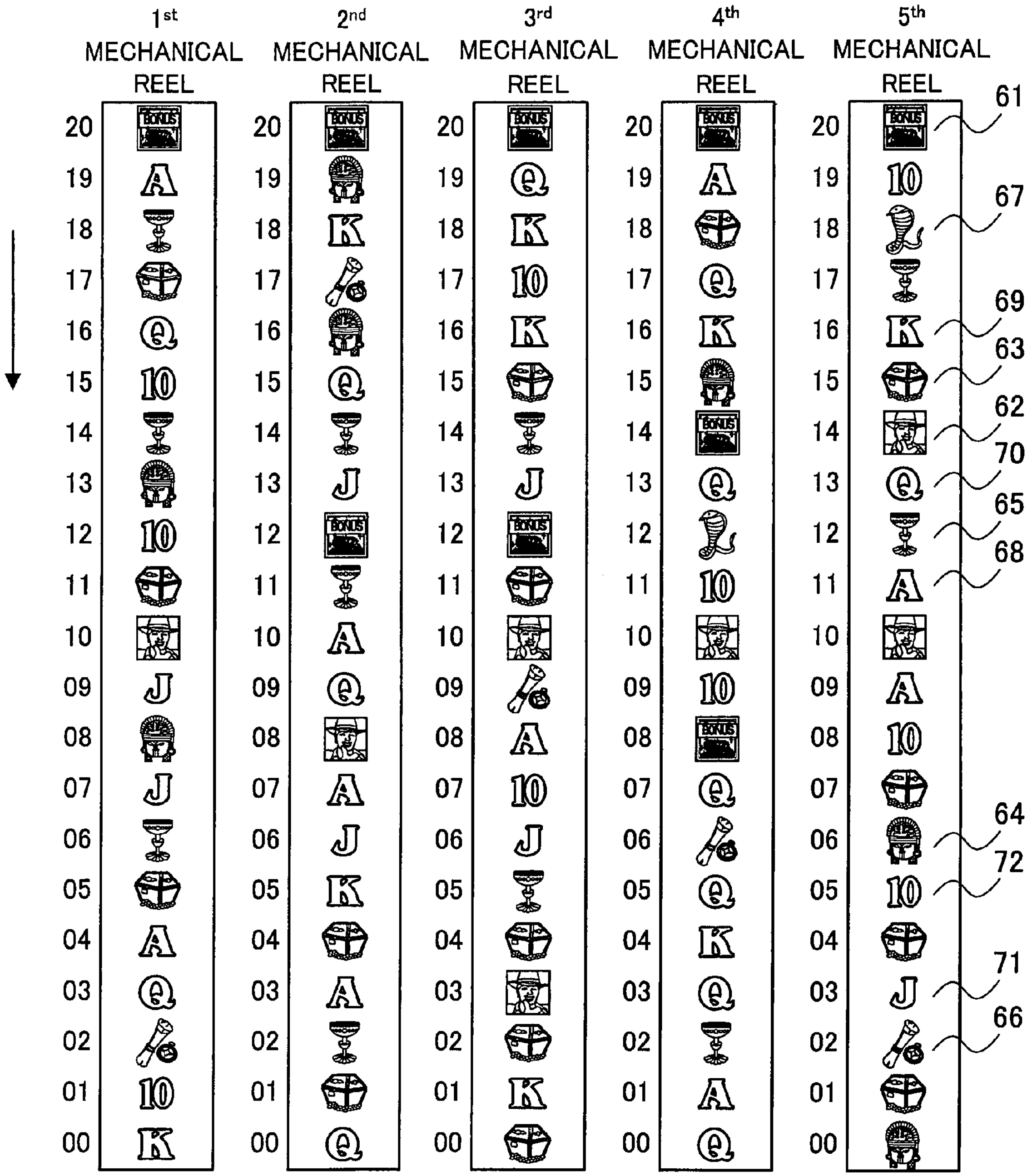
FIG. 6 is a schematic diagram illustrating columns of symbols on circumferential surfaces of mechanical reels.

FIG. 6 shows a column of twenty-one symbols for each of the mechanical reels 3A to 3E. Code numbers "00" to "20" are assigned to symbols for each of the mechanical reels 3A to 3E. These code numbers are tabulated as a data table which is stored (memorized) in ROM 108 (see FIG. 7) to be described later. Each of the mechanical reels 3A to 3E bears a column of symbols including: a "bonus" trigger symbol (symbol 61), and hereinafter referred to as "bonus"; a "wild" symbol (symbol 62), "wild"; a "treasure box" symbol (symbol 63), "treasure box"; a "gold mask" symbol (symbol 64), "gold mask"; a "holy grail" symbol (symbol 65), "holy grail"; a "compass and map" symbol (symbol 66), "compass and map"; a "snake" symbol (symbol 67), "snake"; an "ace" symbol (symbol 68), "ace"; a "king" symbol (symbol 69), "king"; a "queen" symbol (symbol 70), "queen"; a "jack" symbol (symbol 71), "jack"; and a "10" symbol (symbol 72), "10". When each of the mechanical reels 3A to 3E is rotated in the normal direction, a column of symbols moves in a direction shown by an arrow in FIG. 6.

In the embodiment, roles including bonus, wild, snake, treasure box, gold mask, holy grail, compass and map, ace, king, queen, jack, and 10 are provided to form an award. Award data is the control information which correlates a payout given to a player and a combination of symbols. The control information is applied to stop control for each of the mechanical reels 3A to 3E, switching of games, and payout of coins.

In the embodiment, there are two types of games including a basic game, and a free game in which the player is not required to bet coins. The tables applied to these two types of games differ from each other. More specifically, the two types of games differ from each other in the combination of symbols required to win an award in an internal lottery and the probability to win the award.

Figure 7:
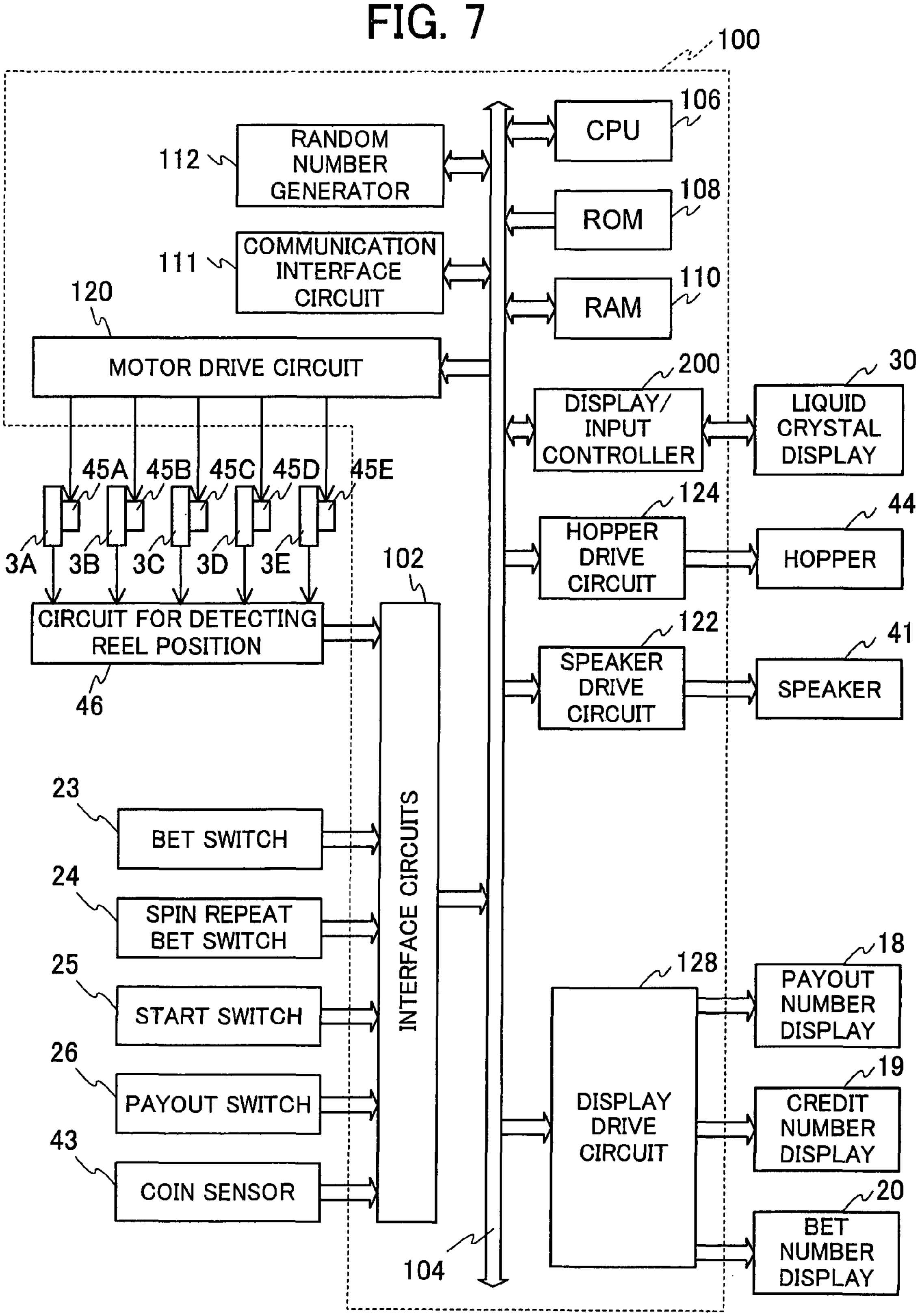
FIG. 7 is a block diagram showing a controller of the slot machine.

As shown in FIG. 7, the controller 100 is a micro computer, which includes interface circuits 102, an input/output bus 104, CPU 106, ROM 108, RAM 110, a communication interface circuit 111, a random number generator 112, a motor drive circuit 120, a speaker drive circuit 122, a hopper drive circuit 124, a display drive circuit 128 and a display/input controller 200.

The interface circuits 102 are electrically connected with the input/output bus 104, which carries out input and output of data signals and address signals for CPU 106.

The start switch 25 is electrically connected with the interface circuits 102. In the interface circuits 102, a start signal generated by the start switch 25 is transformed into a predetermined form of signal to be supplied to the input/output bus 104.

The BET switch 23, the spin repeat bet switch 24 and the payout switch 26 are also electrically connected with the interface circuits 102. In the interface circuits 102, a switching signal generated by each of these switches 23, 24 and 25 is transformed into a predetermined form of signal to be supplied to the input/output bus 104.

A coin sensor 43 is also electrically connected with the interface circuits 102. The coin sensor 43 detects coins inserted into the coin insertion slot 22, and is disposed at an appropriate position relative to the coin insertion slot 22. In the interface circuits 102, a sensing signal generated by the coin sensor 43 is transformed into a predetermined form of signal to be supplied to the input/output bus 104.

A circuit 46 for detecting a reel position is also electrically connected with the interface circuits 102. The circuit 46 detects a rotational position of each of the mechanical reels 3A to 3E receiving pulse signals sent by a sensor for detecting a reel rotational position (not shown). In the interface circuits 102, a signal generated by the circuit 46 is transformed into a predetermined form of signal to be supplied to the input/output bus 104.

ROM 108 and RAM 110 are also electrically connected with the input/output bus 104.

In response to the start switch 25 accepting an instruction for starting the basic game, CPU 106 controls each of the mechanical reels 3A to 3E in a dynamic mode such that the symbols in each column are dynamically displayed. Subsequently, CPU 106 controls each of the mechanical reels 3A to 3E to come to rest so as to display the symbols in a static mode. If the combination of the symbols at rest is entitled to an award, CPU 106 reads out a first gaming program that is configured to give an instruction for paying out an amount of game currency in accordance with the award, carrying out the basic game.

When a bonus trigger symbol or a combination including a bonus trigger symbol appears while each of the mechanical reels 3A to 3E comes to rest, CPU 106 reads out a second gaming program, starting a free game.

ROM 108 stores a control program to centrally control the slot machine 10, a computer program to carry out routines shown in FIG. 9 and FIG. 13 (hereinafter referred to as "routine program"), initial data to execute the control program, and various data tables for a lottery. The tables shown in FIG. 10 to FIG. 12, FIG. 15 and FIG. 18 are examples of the data tables described above.

RAM 110 temporarily stores flags, variables and the like which are used in the control program described above.

The communication interface circuit 111 is electrically connected with the input/output bus 104. The communication interface circuit 111 is for communication with servers and the like through various communication networks including public telecommunication networks and LAN.

The random number generator 112 is also electrically connected with the input/output bus 104. The random number generator 112 generates random numbers in a predetermined range of "0" to "65535" (the sixteenth power of two minus one), for example. It may be alternatively possible that CPU 106 generates random numbers.

The motor drive circuit 120 and the display drive circuit 128 are electrically connected with the input/output bus 104. The motor drive circuit 120 drives the stepper motors 45A to 45E. The display drive circuit 128 drives the various displays 18 to 20. CPU 116 controls the stepper motors 45A to 45E through the motor drive circuit 120, and the displays 18 to 20 through the display drive circuit 128.

The speaker drive circuit 122 for the speaker 41 is also electrically connected with the input/output bus 104. CPU 106 reads out sound data stored in ROM 108, controlling transmission of the sound data to the speaker drive circuit 122 through the input/output bus 104. In this way, the speaker 41 generates a predetermined effect sound.

The hopper drive circuit 124 for driving the hopper 44 is also electrically connected with the input/output bus 104. When CPU 106 receives a payout signal from the payout switch 26, CPU 106 controls transmission of a drive signal to the hopper drive circuit 124. Accordingly, the hopper 44 pays out coins such that the number of them is equivalent to the current number of coins remaining as credit, which is stored in a predetermined memory area of RAM 110.

The display/input controller 200 is also electrically connected with the input/output bus 104. CPU 106 generates an instruction for displaying an image according to the status and outcome of a game, controlling transmission of the instruction to the display/input controller 200 through the input/output bus 104. When the display/input controller 200 receives the instruction from CPU 106, it generates a drive signal, transmitting it to the liquid crystal display 30. In this way, the liquid crystal display 30 displays an image on its transparent liquid crystal panel 34. Receiving an input signal from the touch panel 32 on the liquid crystal display 30, the display/input controller 200 transmits the input signal to CPU 106 through the input/output bus 104.

Figure 8:
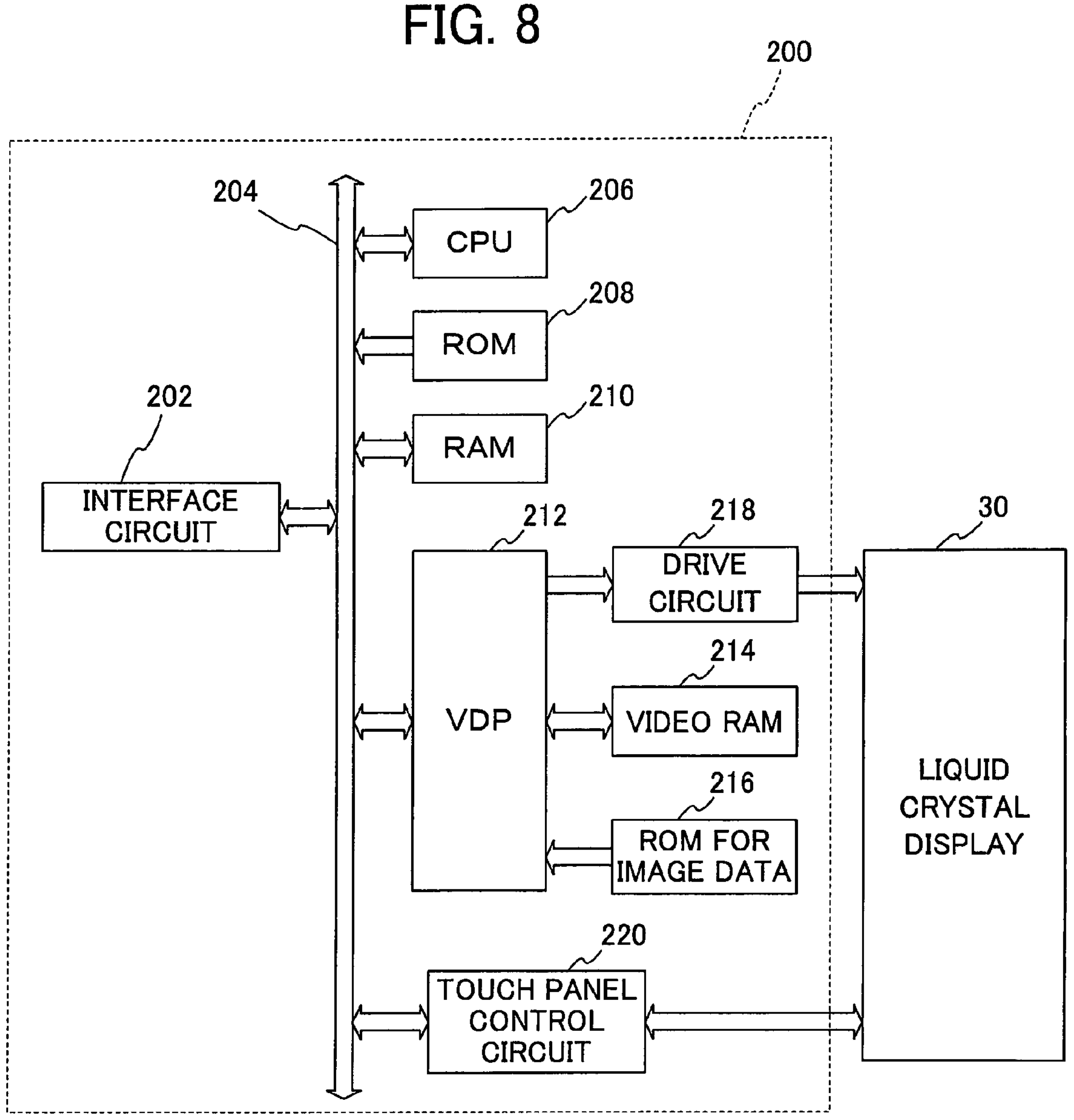
FIG. 8 is a block diagram showing a display/input controller of the slot machine.

As shown in FIG. 8, the aforementioned display/input controller 200 is a sub-microcomputer which controls image displaying processes and input signals coming from the touch panel 32. The controller 200 includes an interface circuit 202, an input/output bus 204, CPU 206, ROM 208, RAM 210, VDP 212, video RAM 214, ROM 216 for image data, a drive circuit 218, and a touch panel control circuit 220.

The interface circuit 202 is electrically connected with the input/output bus 204. An instruction for displaying an image generated by CPU 106 of the controller 100 is given to the input/output bus 204 through the interface circuit 202. The input/output bus 204 conducts input and output of data signals and address signals for CPU 206.

ROM 208 and RAM 210 are also electrically connected with the input/output bus 204. A computer program for controlling display is stored in ROM 208. In response to an instruction for displaying an image sent from CPU 106 of the controller 100, the computer program generates an instruction for generating a drive signal to be supplied to the liquid crystal display 30. On the other hand, RAM 210 stores flags and variables applied to the computer program for controlling display.

VDP 212 is also electrically connected with the input/output bus 204. VDP 212, which includes a so-called sprite circuit, screen circuit and pallet circuit, is a processor which is able to perform versatile processing to display images on the liquid crystal display 30. The video RAM 214 and ROM 106 for image data are electrically connected with VDP 212. The video RAM 214 stores image data in response to an instruction for displaying an image, which is given by CPU 106 of the controller 100. ROM 216 stores various image data including image data of rendered effects. Moreover, the drive circuit 218 that generates drive signals for the liquid crystal display 30 is electrically connected with VDP 212.

CPU 206 reads out the display control program stored in ROM 208 and executes it, controlling the video RAM 214 to store the image data, which is displayed on the liquid crystal display 30 in response to the instruction sent by CPU 106 of the controller 100. This instruction for displaying an image includes various types of instructions, including one for displaying an image of rendered effects described above.

ROM 216 for image data stores various image data including the image data of rendered effects.

The touch panel control circuit 220 receives a signal resulting from an action applied to the touch panel 32 on the liquid crystal display 30. The touch panel control circuit 220 transmits the signal to CPU 106 through the input/output bus 204.

As explained above, it is understood that various processes described in the appended claims are executed by the controller 100, which includes ROM 108, CPU 106, RAM 110 and the display/input controller 200. ROM 108 stores computer programs for executing the routines described above. CPU 106 conducts various kinds of control in accordance with the computer programs stored in ROM 108. RAM 110 serves as a working area for CPU 106. The display/input controller 200 controls driving of the liquid crystal display 30. The processes executed by the display/input controller 200 may be, but are not necessarily, included in the processes described in the appended claims. The display/input controller 200 includes CPU 206, ROM 208, RAM 210, VDP 212, the video RAM 214, ROM 216 for image data, and the drive circuit 218. This will be made more definite by the following description on an operation of the slot machine 10 with reference to FIG. 9 and FIG. 13.

Figure 9:
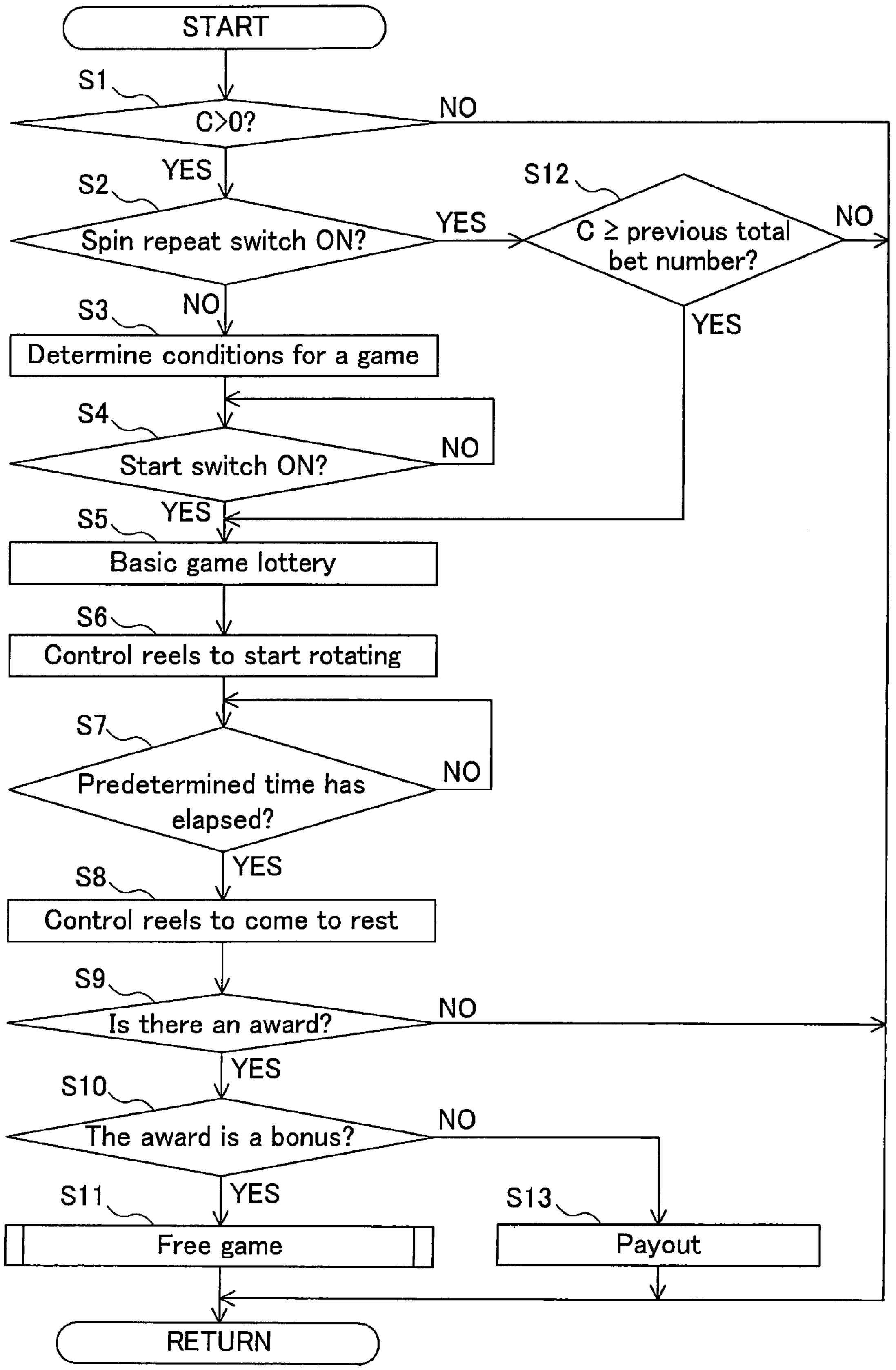
FIG. 9 is a flow chart showing a flow for the main processing.

FIG. 9 shows routines for controlling the slot machine 10 executed by the controller 100. The main program of the slot machine 10 executed in advance calls a series of routines in FIG. 9 at a predetermined timing, and executes them.

In the following description, the slot machine 10 has been in operation in advance, and variables used by CPU 106 of the controller 100 have been initialized to predetermined values. Accordingly, the slot machine 10 is in normal operation.

As shown in FIG. 9, CPU 106 of the controller 100 determines whether or not coins inserted by a player remain as credit (step S1). More specifically, CPU 106 reads out a credit number C stored in RAM 110, executing processes according to the credit number C. When the credit number C equals “0” (NO in step S1), CPU 106 terminates the routine without executing any process, because it is not possible to start a game. When the credit number C is not less than “1” (YES in step S1), CPU 106 determines that coins remain as credit, moving the process to step S2.

In step S2, CPU 106 determines whether or not a pushing action has been applied to the spin bet repeat switch 24 (step S2). When the switch 24 has been pushed and CPU 106 receives a signal from the switch 24 (YES in step S2), CPU 106 moves the process to step S12. On the other hand, when CPU 106 does not receive a signal from the switch 24 after a predetermined lapse of time (NO in step S2), CPU 106 determines that the switch 24 has not been pushed and moves the process to step S3.

In step S3, CPU 106 determines conditions for a game, moving the process to step S4. More specifically, CPU 106 determines the number of coins bet on pay lines L1 to L9 in this game. Receiving signals indicative of pushing action for the BET switch 23, CPU 106 determines a BET number applied to the pay lines L1 to L9 in accordance with the number of received signals, controlling RAM 110 to store this BET number into a predetermined memory area. CPU 106 reads out the credit number C written in RAM 110, subtracting a total BET number including the above-mentioned BET number from the read-out credit number C. CPU 106 controls RAM 110 to store the resulting value into a predetermined memory area.

On the other hand, in step S12, CPU 106 determines whether or not the credit number C is equal to or greater than the total bet number in a previous game. In other words, CPU 106 determines whether or not it can start a game in response to a touching action applied to the spin repeat bet switch 24. More specifically, when the spin repeat bet switch 24 is pushed and a signal coming from the switch 24 enters CPU 106, CPU 106 reads out the credit number C and the BET number for the effective pay lines L1 to L9 in the previous game. CPU 106 selects a subsequent process according to whether or not the current credit number C is equal to or greater than the total bet number for the previous game. When CPU 106 determines that the credit number C is less than the total bet number (NO in step S12), CPU 106 terminates the routine without any processes, because it is not possible to start a game. On the other hand, when CPU 106 determines that the credit number C is equal to or greater than the total bet number for the previous game (YES in step S12), CPU 106 subtracts the total bet number for the previous game from the credit number C, controlling RAM 110 to store the resulting value into a predetermined memory area. Subsequently, CPU 106 moves the process to step S5.

In step S4, CPU 106 stands by, monitoring a signal coming from the start switch 25. When CPU 106 receives a signal indicative of pushing action for the start switch 25 (YES in step S4), CPU 106 determines that the start switch 25 has been turned on, moving the process to step S5.

In step S5, CPU 106 carries out a basic game lottery so as to determine an award by an electronic lottery. In the basic game lottery, CPU 106 searches a table showing a probability for winning an award in a basic game so as to determine an award, with the random number generated by the random number generator 112 as a parameter.

FIG. 10 is an example of the table described above. The table contains the information about the range of random numbers and the probability to win an award in the internal lottery. The range of random numbers extracted from the table is “0” to “65535”. In this table, when a random number between “1500” and “1549” is extracted out of the range of random numbers “0” to “65535” in the lottery for the basic game, CPU 106 sets the treasure box as an award. In other words, the probability of the treasure box to be selected as an award is “50/65536.”

In the following step S6 as shown in FIG. 9, CPU 106 controls the mechanical reels 3A to 3E to start rotating. More specifically, CPU 106 controls the mechanical reels 3A to 3E to start rotating sequentially or simultaneously according to the symbol allocation table stored in RAM 110.

An example of the symbol allocation table is shown in FIG. 11. The symbol allocation table includes the information about the symbols corresponding to the positions (code numbers) on the circumferential surface for each of the mechanical reels 3A to 3E.

After starting the rotation of the mechanical reels 3A to 3E, CPU 106 counts the number of drive pulses transmitted to each of the stepper motors 45A to 45E, controlling RAM 110 to store it into a predetermined memory area. Reset pulses, which are generated each time the mechanical reels 3A to 3E rotate, enter CPU 106 through the circuit 46 for detecting a reel position. CPU 106 controls RAM 110 to clear the drive pulse numbers to be “0” with a reset pulse. In this way, a count number representative of a rotational position with respect to one rotation for each of the mechanical reels 3A to 3E is stored in a predetermined memory area of RAM 110. The symbol allocation table stored in RAM 110 correlates a rotational position and a symbol for each of the mechanical reels 3A to 3E. When CPU 106 searches the symbol allocation table, CPU 106 correlates one of code numbers given at regular rotational pitches relative to a reference point indicated by a reset pulse and a symbol code number assigned to a symbol for each of the mechanical reels 3A to 3E.

As shown in FIG. 9, when CPU 106 controls the mechanical reels 3A to 3E to start rotating, CPU 106 stands by until a predetermined time has elapsed (step S7). When the predetermined time has elapsed (YES in step S7), CPU 106 controls the respective reels 3A to 3E to stop rotating (step S8). More specifically, CPU 106 sequentially or simultaneously controls the respective reels 3A to 3E to stop rotating in accordance with the award having been written into the predetermined memory area of the RAM 110. In this way, the symbols at rest corresponding to the award determined in step S5 are displayed in a display area visible to a player.

A description is given of the table showing the amount of paid out game currency for a basic game with reference to FIG. 12. The table is applied to a basic game, and represents the relationship between an award and the resulting amount of game currency to be paid out.

A bonus is made effective when three or more “bonus” symbols come to rest on a pay line. When a game is entitled to a bonus, CPU 106 initiates a free game (a bonus game) which is more advantageous than a basic game.

A wild is made effective when five “wild” symbols come to rest on a pay line. When a game is entitled to a wild, CPU 106 controls the payout of fifty coins for the credit number 1, a hundred coins for the credit number 2, and a hundred and fifty coins for the credit number 3.

A reach is made effective when a combination of symbols such as “bonus-bonus-treasure box” comes to rest on a pay line. More specifically, it is made effective when one of the combinations, “bonus-bonus-treasure box”, “bonus-bonus-gold mask”, “bonus-bonus-holy grail” and “bonus-bonus-compass and map”, comes to rest on a pay line. When a game is entitled to a reach, CPU 106 controls the payout of fifty coins for the credit number 1, a hundred coins for the credit number 2, and a hundred and fifty coins for the credit number 3.

A snake is made effective when a “snake” symbol comes to rest on the fifth mechanical reel 3E. When a snake is made effective, CPU 106 controls the liquid crystal display 30 to display a snake character on the display surface 31*a*, with the rendered effects of fighting between the character 81 described above and the snake character. When the character 81 defeats the snake character, CPU 106 controls a larger payout of coins. In contrast, when the character 81 is defeated by the snake character, CPU 106 controls a smaller payout of coins.

A treasure box is made effective when three or more “treasure box” symbols come to rest on a pay line. CPU 106 controls the payout of twenty-five coins for the credit number 1, fifty coins for the credit number 2, and seventy-five coins for the credit number 3.

A gold mask is made effective when three or more “gold mask” symbols come to rest on a pay line. CPU 106 controls the payout of twenty coins for the credit number 1, forty coins for the credit number 2, and sixty coins for the credit number 3.

A holy grail is made effective when three or more “holy grail” symbols come to rest on a pay line. CPU 106 controls the payout of fifteen coins for the credit number 1, thirty coins for the credit number 2, and forty-five coins for the credit number 3.

A compass and map is made effective when three or more “compass and map” symbols come to rest on a pay line. CPU 106 controls the payout of ten coins for the credit number 1, twenty coins for the credit number 2, and thirty coins for the credit number 3.

An ace is made effective when three or more “ace” symbols come to rest on a pay line. CPU 106 controls the payout of five coins for the credit number 1, ten coins for the credit number 2, and fifteen coins for the credit number 3.

A king is made effective when three or more “king” symbols come to rest on a pay line. CPU 106 controls the payout of four coins for the credit number 1, eight coins for the credit number 2, and twelve coins for the credit number 3.

A queen is made effective when three or more “queen” symbols come to rest on a pay line. CPU 106 controls the payout of three coins for the credit number 1, six coins for the credit number 2, and nine coins for the credit number 3.

A jack is made effective when three or more “jack” symbols come to rest on a pay line. CPU 106 controls the payout of two coins for the credit number 1, four coins for the credit number 2, and six coins for the credit number 3.

A 10 is made effective when three or more “10” symbols come to rest on a pay line. CPU 106 controls the payout of one coin for the credit number 1, two coins for the credit number 2, and three coins for the credit number 3. When a 10 is made effective, a player gains the same number of coins as that of inserted ones. This means that he or she can proceed with a subsequent game without decreasing his or her number of coins. In other words, the 10 enables the player to continue the game without inserting additional coins.

With reference to FIG. 9, when the mechanical reels 3A to 3E have come to rest, CPU 106 determines whether or not there is a combination of symbols entitled to an award (step S9). More specifically, CPU 106 makes the determination based on award flags for pay lines L1 to L9 stored in the predetermined memory area of RAM 110. When an award flag is not activated (NO in step S9), CPU 106 determines there is no combination entitled to an award, terminating the routine. On the other hand, when a flag is activated (YES in step S9), CPU 106 determines there is a combination entitled to an award, moving the process to step S10.

In step S10, CPU 106 determines whether or not the combination entitled to an award is a bonus, which gives a player a chance to try a free game (a bonus game). More specifically, CPU 106 makes the determination based on a type of flag stored in RAM 110. When an activated flag coincides with a bonus award (YES in step S10), CPU 106 determines a start of a free game, moving the process to step 11. On the other hand, when the activated flag does not coincide with a flag indicating the start of a free game (NO in step S10), CPU 106 determines that the award is entitled to another award other than a bonus, moving the process to step S13.

In step S11, CPU 106 controls a free game, which is to be described with reference to FIG. 13. When the free game is finished, CPU 106 terminates the routine.

In step S13, CPU 106 controls a payout of coins in accordance with an award other than a bonus. More specifically, CPU 106 searches the table as shown in FIG. 12, calculating the number of coins to be paid out for the award. CPU 106 reads out the credit number C stored in RAM 110. Adding the calculated number of coins to the credit number C, CPU 106 controls RAM 110 to store the resulting summation in a predetermined memory area. CPU 106 controls the credit number display 19 to display the stored number. When CPU 106 completes the process in step S13, CPU 106 terminates the routine.

A description is given in the following of a free game with reference to FIG. 13.

CPU 106 sets fifteen as the power count N (step S21).

After setting fifteen as the power count N, CPU 106 controls the liquid crystal display 30 to display an image of three sun relief sculptures (selectable elements) on the display surface 31*a* (step S22). As a result of executing the process in step S22, CPU 106 can control the liquid crystal display 30 to display the image shown in FIG. 14(1) on the display surface 31*a*. CPU 106 moves the process to step S23 after finishing step S22.

In step S23, CPU 106 determines whether or not the player has selected one sun relief sculpture by his or her instruction via the touch panel. When the determination is affirmative, CPU 106 moves the process to step S24. When the determination is negative, CPU 106 repeats the process in step S23 until the determination becomes affirmative.

In step S24, CPU 106 carries out a lottery for a free game so as to determine an award by an electronic lottery. CPU 106 searches the table showing a probability for winning an award in a free game, determining an award in accordance with a random number generated by the random number generator 112. Finishing the lottery, CPU 106 moves the process to step S25.

The table shown in FIG. 15 is an example of the table described above. The table includes the range of random numbers corresponding to an award and the information about the probability of winning the award. The range of extracted random numbers is "0" to "65535". In this table, the random numbers from "20000" to "32768" are entitled to a high payout. Accordingly, the probability of winning the high payout is "12769/65536".

Figure 13:
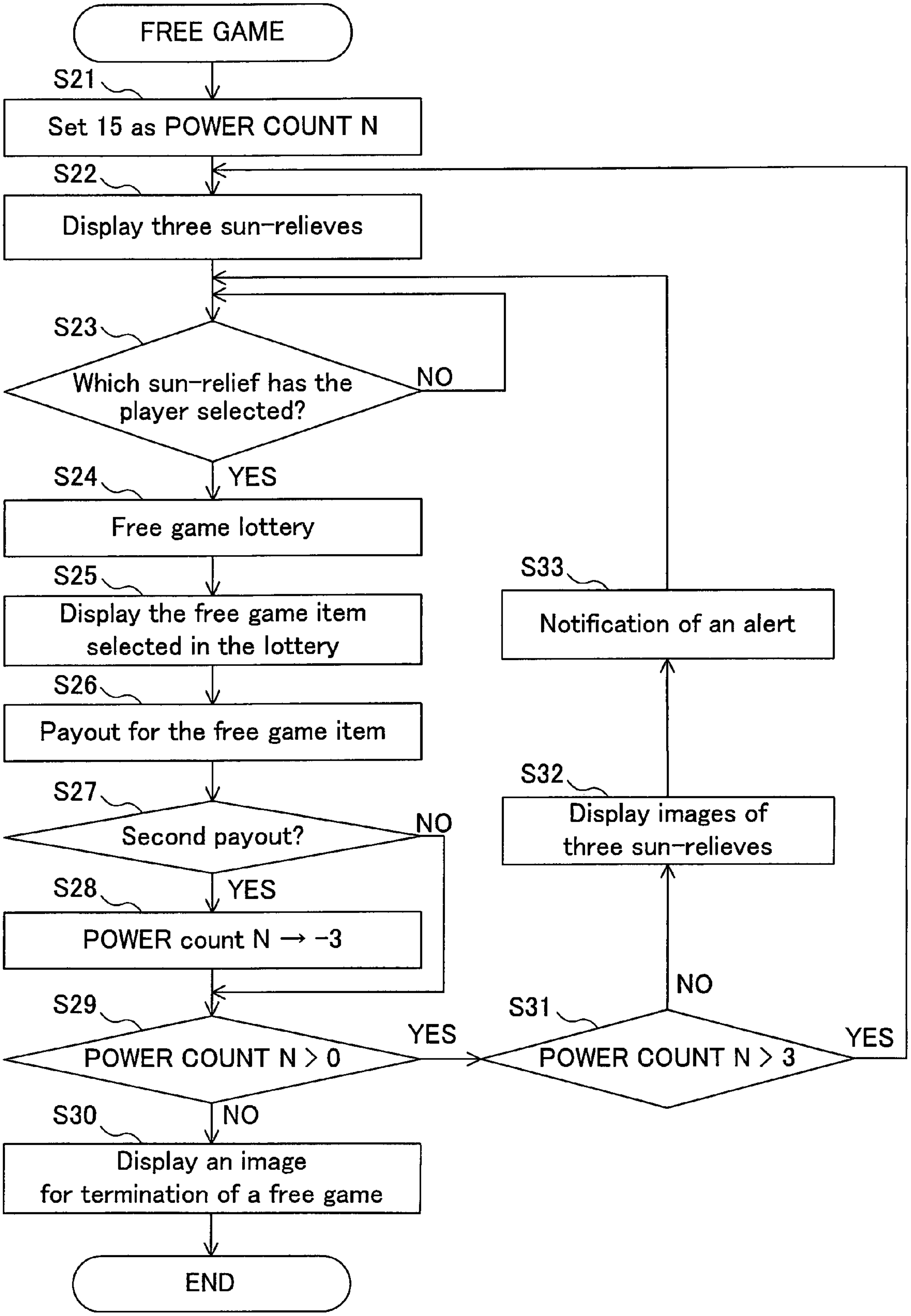
FIG. 13 is a flow chart showing a flow of processes for a free game of the slot machine.

In step S25 as shown in FIG. 13, CPU 106 executes the process for controlling the liquid crystal display 30 to display an image corresponding to the award on the display surface 31*a*. More specifically, when the award is a scorpion (free game/bonus game item), CPU 106 controls the display surface 31*a* to display an image (1) shown in FIG. 16 first, and subsequently an image (2) shown in FIG. 16. When the award is a treasure (free game/bonus game item), CPU 106 controls the displaying of the image (1) shown in FIG. 16 first, and subsequently an image (3) shown in FIG. 16. Finishing the process in step S25, CPU 106 moves the process to step S26.

Figure 16:
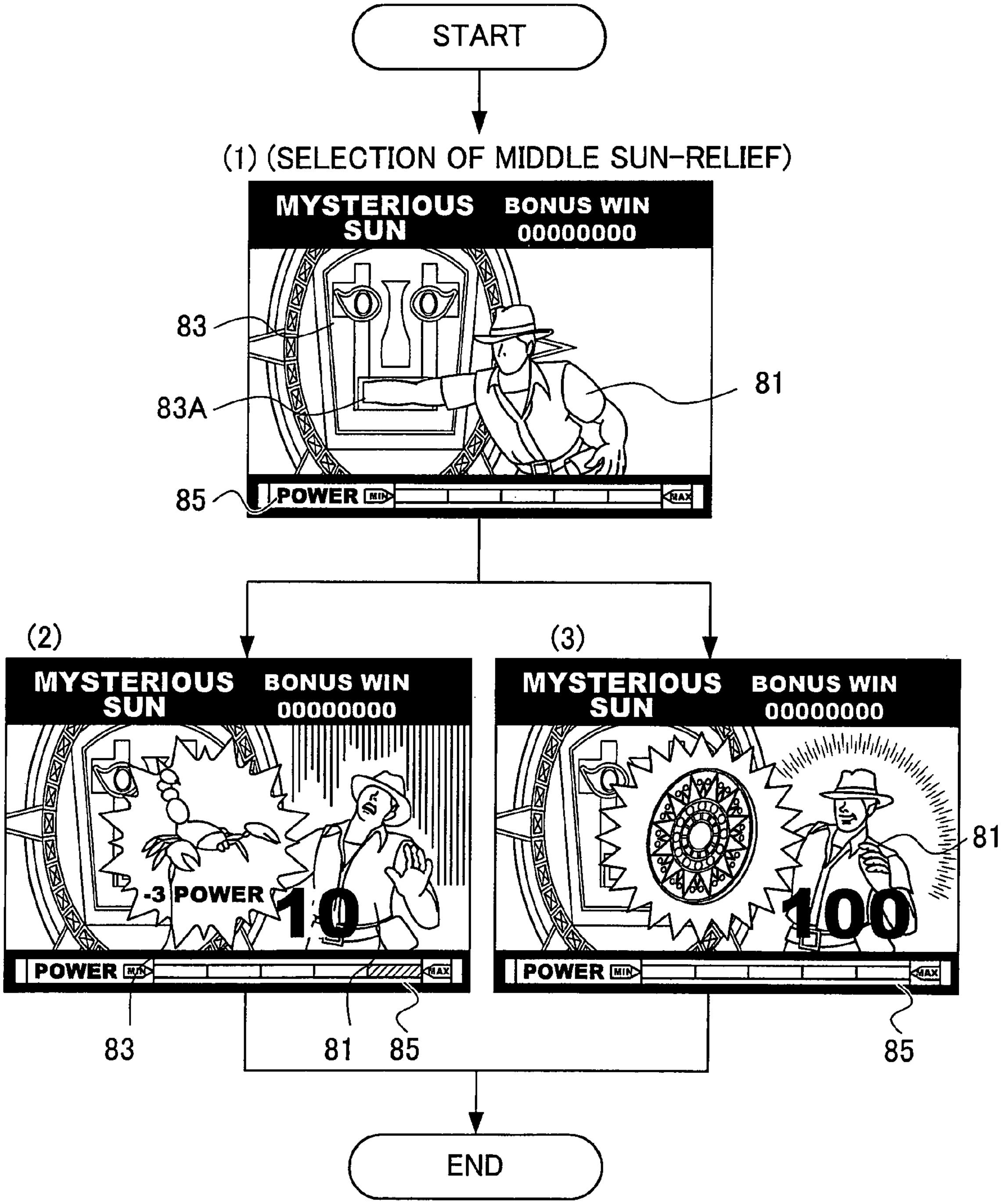
FIG. 16 is a schematic diagram illustrating an example of displaying on the liquid crystal display.

With reference to FIG. 16, a description is given of an example of a display for the case of the power count N equal to fifteen, when a player touches one of the sun relief sculptures 82 to 84 via the touch panel.

The image (1) shown in FIG. 16 illustrates an example of display when the player touches the middle sun relief sculpture 83 out of the sun relief sculptures 82 to 84. In this example, the character 81 is inserting his arm into a hole 83A of the central sun relief sculpture 83. The speaker 41 described above provides sound: "Let's select this one."

The image (2) shown in FIG. 16 illustrates an example of a display when the free game item hidden in the hole 83A is a scorpion. In this case, the liquid crystal display 30 displays the character 81 who is screaming with a scorpion bite. The speaker 41 makes the sound: "Woo!!".

The characters "−3 POWER" are displayed under the scorpion. Four out of five divisions are light in a display 85 for physical strength. In this way, the player knows that the character 81 has suffered damage bitten by the scorpion (second free game/bonus game item).

In this example of display, the character "10" is also displayed in front of the character 81. In this way, the player knows that he or she has gained ten coins (a smaller number of coins).

The image (3) shown in FIG. 16 illustrates an example of a display when the free game item hidden in the hole 83A is a treasure. In this example, the joyful character 81 grasping the treasure (first free game/bonus game item) is displayed. The speaker 41 makes the sound: "Yoo-hoo!!".

In the free game described above, the player selects one of the three sun relief sculptures 82 to 84. One of the free game items is displayed in response to the selection of the sun relief sculpture by the player. And the player gains the payout in accordance with the displayed free game item. In this way, the slot machine can let the player feel that he or she is involved in the lottery of the payout acquired in a free game.

Although the slot machine internally determines the payout by an electronic lottery, it can let the player feel that his or her decision is reflected in the outcome of a game. This is implemented by giving the player a chance to select one out of the plural sun relief sculptures 82 to 84. In this way, the slot machine can eliminate suspicion by the player about the payout of a free game, so that it can make the player more interested in the game.

The five divisions are all light in the display 85 for health strength. In this way, the player knows that there is no change in the physical strength of the character 81. In this example of display, the character "100" is displayed in front of the character 81. This enables the player to know he or she has gained 100 coins (a larger number of coins).

The display surface 31*a* of the liquid crystal display 30 displays a plurality of openings (sun relief sculptures) through which the character 81 takes out one of the first free game item (treasure with higher payout) and the second free game item (scorpion with lower payout). The portion of the display area 31*a*, where the plurality of openings is displayed, serves as a touch panel. When the player touches the touch panel so as to select one opening, the slot machine carries out a lottery to determine which one of the first and second free game items is to be taken out via the selected opening. When the slot machine determines the first free game item which is to be displayed on the display surface 31*a* of the liquid crystal display 30, it provides the player with the first payout (higher payout). In contrast, when the slot machine determines the second free game item which is to be displayed on the display surface 31*a*, it provides the player with the second payout (lower payout), which is lower than the first payout.

As described above, the slot machine gives the player a chance to select an opening in the free game, in response to an instruction given by the player via the touch panel. One of the free game items corresponding to high and low payouts is taken out via the opening. The slot machine performs the payout in accordance with the resulting free game item. Accordingly, the slot machine can let the player feel that he or she is involved in the lottery of the free game. In other words, although one of the high and low payouts has been determined by an internal lottery which is executed prior to the outcome of the free game, the slot machine gives the player a chance to select the opening. In this way, the slot machine can let the player feel that his or her will is reflected in the payout of the free game.

The above description has been given for the case that the power count N equals fifteen. When the power count N is less than or equal to three, the slot machine provides an alert display shown in FIG. 17 even after the player has touched one of the sun relief sculptures 82 to 84, in a similar manner to that shown in FIG. 14(2).

In step S26 as shown in FIG. 13, CPU 106 searches the table shown in FIG. 18 to be described later, calculating the number of coins to be paid out corresponding to an award (free game item). CPU 106 controls the payout of the calculated number of coins. Subsequently, CPU 106 reads out the credit number stored in the predetermined memory area of the RAM 110, and adds the calculated number to the read-out credit number. CPU 106 controls RAM 110 to store the summation into a predetermined area. CPU 106 controls the credit number display 19 to display the stored number. Subsequently, CPU 106 moves the process to step S28.

A description is given of a table showing the amount of game currency paid out for an award of a free game with reference to FIG. 18. This table is used for a free game, and shows the relationship between an award, the number of coins to be paid out, and the value subtracted from the power count.

When an award (free game item) results in the first payout (treasure), CPU 106 controls the payout of a hundred coins. In this case, CPU 106 subtracts zero from the power count value. In contrast, when the award (free game item) results in the second payout (scorpion), which is lower than the first payout, CPU 106 controls the payout of ten coins. In this case, CPU 106 subtracts three from the power count value.

In step S27 as shown in FIG. 13, CPU 106 determines whether or not the award is the second payout (scorpion). When the determination is affirmative, CPU 106 moves the process to step S28. When the determination is negative, CPU 106 moves the process to step S29.

In step S28, CPU 106 searches the table shown in FIG. 18, subtracting the value in accordance with the award from the power count N. CPU 106 controls the RAM 110 to store this resulting value.

After the subtraction, CPU 106 determines whether or not the power count N is positive (step S29). When the power count N is positive (YES in step S29), CPU 106 moves the process to step S31, where CPU 106 determines whether or not the power count N exceeds three. When the determination is affirmative in step S31, CPU 106 moves the process to step S22. When the determination is negative, CPU 106 moves the process to step S32.

When the POWER count N is negative (NO in step S29), CPU 106 moves the process to step S30.

In step S32, CPU 106 controls the liquid crystal display 30 to display the three sun relief sculptures on the display surface 31*a*, moving the process to step S33. In step S33, CPU 106 executes the process for controlling the liquid crystal display 30 to display the three sun relief sculptures with an alert on the display surface 31*a*. Executing the process in step S33, CPU 106 can control the liquid crystal display 30 to display an image as shown in FIG. 14(2) on the display surface 31*a*. Finishing the process in step S33, CPU 106 moves the process to step S23.

A description is given of an example of display at the start of a free game with reference to FIG. 14(1) and FIG. 14(2).

FIG. 14(1) shows an example of a display for the power count N equal to fifteen. FIG. 14(2) is, on the other hand, an example of a display for the power count N equal to three. The power count is an index indicating the physical strength of the character 81 which is displayed on the display surface 31*a* of the liquid crystal display 30. The larger this value is, the more physical strength the character 81 maintains.

These examples illustrate the character 81 discovering the three sun relief sculptures (openings). The sun relief sculptures 82 to 84 have holes 82A to 84A, respectively. The speaker 41 provides the sound: "Something seems to be hidden in the hole." In this way, the player knows that the sun relief sculptures 82 to 84 displayed on the display surface 31*a* of the liquid crystal display 30 serve as a touch panel, by which he or she can select one of the three sun relief sculptures 82 to 84.

The display 85 of physical strength is disposed in a lower portion of the display surface 31*a*. "MAX" and "MIN" are indicated on the respective left and right sides of the display 85. Also, five divisions are indicated in the display 85. In the example shown in FIG. 14(1), the five divisions are all light, which notifies the player that the character 81 has the maximum physical strength.

In the example shown in FIG. 14(2), only one of the five divisions is light. In addition, the word of "WARNING" is indicated above the display 85 of physical strength, and the speaker 41 makes an alert sound. In this way, the player knows that the free game will be terminated depending on the outcome of the game.

In this connection, a division corresponds to three power counts. More specifically, when the power count is 1 to 3, one division from the left out of the five divisions is light. When the power count is from 4 to 6, two divisions from the left are light. When the power count is 7 to 9, three divisions from the left are light. When the power count is 10 to 12, four divisions from the left are light. When the power count is 13 to 15, all the five divisions are light.

In step S30, CPU 106 controls the liquid crystal display 30 to display an image indicating the termination of a free game on the display surface 31*a*, terminating the routine.

FIG. 19 illustrates an example of display for the power count "0", which is the fourth example during the free game. In this example, the character 81 is running away from the sun relief sculptures 82 to 84. The speaker 41 simultaneously makes a sound indicating disappointment. In this way, the player knows that the free game has been finished, and the basic game is instead going to start.

As described above, CPU 106 repeats the sequence of processes associated with a free game before the display of the power meter indicates "0". When the power of the character 81 reaches "0", CPU 106 terminates the free game. When the indication of the power meter is approaching "0", which is an index for the power of the character 81, CPU 106 alerts the player to the urgency of the exhaustion of the power. In this way, the player knows that the free game is going to be terminated.

Whether or not the power of the character 81 decreases depends on which one of the first free game item (treasure) and the second free game item (scorpion) the character 81 takes out via the opening (sun relief sculpture), which the player has selected via the touch panel. This may let the player feel that he or she is participating in the determination of the number of free games.

In addition, there are some different approaches to give the alerts described above. One is to let the player visually know the termination of a free game by giving an alert on the display surface 31*a* of the liquid crystal display 30. Another is to let the player audibly know by giving an alert sound. Another is to let the player both visually and audibly know by the combination of the above-mentioned methods.

In step S26, CPU 106 controls the RAM 110 to store the number of coins to be paid out as credit. It may be alternatively possible for CPU 106 to send an instruction for payout to the hopper drive circuit 124 such that the hopper 44 pays out the coins via the coin payout opening 27.

It goes without saying that the free game includes various types of games which have been publicly known.

The embodiment of the invention provides the following advantages:

When the symbols on the respective mechanical reels 3A to 3E have come to rest, and a bonus symbol or a combination including a bonus symbol appears, CPU 106 reads out a computer program so as to perform a free game (a bonus game). More specifically, the liquid crystal display 30 displays the image of the free game, following the start of the free game. In this processing, CPU 106 controls the liquid crystal display 30 to display a plurality of sun relief sculptures 82 to 84 (openings), from which the character 81 takes out one of a treasure (a first free game item) and a scorpion (a second free game item), on the display surface 31*a*. The area on which the sun relief sculptures 82 to 84 are displayed in the display surface 31*a* of the liquid crystal display 30 serves as a touch panel for selecting one of the sun relief sculptures 82 to 84. When the player selects one sun relief sculpture by touching the touch panel, CPU 106 executes an internal lottery to determine which one of the treasure and the scorpion should be taken out with the selected sun relief sculpture. When CPU 106 determines the treasure in the lottery, and controls the liquid crystal display 30 to display the image of the proceedings to take out the treasure on the display surface 31*a*, CPU 106 gives an instruction for giving the player the first payout. When CPU 106, on the other hand, determines the scorpion, and controls the liquid crystal display 30 to display the image of the proceedings to take out the scorpion on the display surface 31*a*, CPU 106 gives an instruction for giving the player the second payout, which is lower than the first payout.

As described above, the slot machine gives the player a chance to select a sun relief sculpture in the free game in response to touching the touch panel. The controller determines one of the free game items corresponding to high and low payouts, with respect to the sun relief sculpture selected by the player. Subsequently, the controller controls the payout in accordance with the resulting free game item. Accordingly, the slot machine can let the player feel that he or she is involved in making a decision on the amount of payout acquired in the free game. In other words, although one of the high and low payouts is determined by the internal lottery which has been executed prior to the outcome of the free game, the slot machine can let the player feel that his or her will be reflected on the payout of the free game.

It is understood that the invention is not restricted to the embodiment described above.

In the embodiment described above, CPU 106 executes the lottery for a free game when the player has selected one of the three sun relief sculptures. However, the invention is not limited to this method. It may be alternatively possible that CPU 106 executes the lottery before it controls the liquid crystal display 30 to display the image of the plurality of sun relief sculptures (before step S23 or step S24 in FIG. 13) on the display surface 31*a*. In this case, it may be possible that the free game item and payout will not vary whichever sun relief sculpture a player selects (the award is independent of the selected sun relief sculpture), as has been described in the embodiment. It may also be possible that they will vary according to which sun relief sculpture the player selects (the award is dependent on the selected sun relief sculpture). If the former approach is adopted, the award is not affected by the selection made by the player. This makes it possible to provide a slot machine which can decrease the suspicion of the player about the payout of a free game, while maintaining an easy control over the profit ratio (the ratio of the number of coins paid out to the bet number). In the latter case on the other hand, it is possible to provide a slot machine that can actually reflect the selection made by the player on the award.

In the embodiment described above, the power count N will not increase. The invention is not limited to this method. When the player wins a high payout as an award, it may be alternatively possible to increase the power count N. This will give the player a chance not only to gain the larger number of coins, but also to have a longer period of time to enjoy free games. In this way, the slot machine is successful in making the player feel more interested in the game.

In the embodiment described above, the free game item displayed and the payout given to the player are determined with respect to one sun relief sculpture selected by the player. The invention is not limited to this method. It may be alternatively possible to determine only the payout, but not the free game item. Since this leads to a decrease in the types of images to be stored in the ROM for storing images, it may be possible to decrease the load imposed on the slot machine 10.

In the embodiment described above, the invention has been described with a mechanical slot machine as an example. In addition to the mechanical slot machine, it is possible to apply this invention to a so-called simulated reel slot machine. In the embodiment described above, this invention is applied to a slot machine having no button for stopping the reels. It is also possible to apply this invention to a slot machine in which stop buttons are respectively provided for the mechanical reels 3A to 3E. This means that the invention has no restriction for how the dynamic and static displays are implemented.

It will be apparent to one skilled in the art that various changes and modifications can be made without departing from the amended claims.

The slot machine according to the invention can prevent a player from having distrust of the payout of a free game. Therefore, the slot machine is useful as a machine with a free game which is initiated if a bonus-trigger symbol or a combination including a bonus-trigger symbol appears in a basic game, in which the predetermined combination of symbols aligned on a pay line is entitled to an award.

What is claimed is:

1. A slot machine comprising:

a symbol displaying device for displaying a plurality of symbols;

a start switch for receiving an instruction for starting a basic game given by a player;

a display for displaying an image of a character and a plurality of images of selectable elements; and a controller configured to implement a process comprising:

(a) controlling the symbol displaying device;

(b) determining whether or not the symbols displayed in the symbol displaying device are entitled to a bonus game;

(c) controlling a transition from a basic game to the bonus game if the controller determines that the symbols are entitled to the bonus game;

(d) controlling the display to operate as a touch panel; and (e) executing a lottery to select one of first and second bonus game items with a selectable element selected by the player via the touch panel, wherein the controller controls the display to display an image of one of the first and second bonus game items, and controls one of first and second payouts in accordance with the outcome of the lottery.

2. A slot machine according to claim 1, wherein the second payout is smaller than the first payout, the controller controls the display to display an image indicating a capacity of the character in a predetermined dynamic fashion in accordance with the number of the second payout provided to the player, and the controller terminates the bonus game in accordance with the number of the second payout, and controls a transition from the bonus game to a basic game.

3. A slot machine according to claim 1, wherein the controller independently executes the process (a) for one column of the symbol displaying device.

4. A slot machine according to claim 1, wherein the start switch receives the instruction for starting a basic game for each game.

5. A slot machine according to claim 1, wherein the symbol displaying device includes mechanical reels.

6. A slot machine according to claim 1, wherein the symbol displaying device includes electrically simulated reels.

7. A method for controlling a slot machine comprising the steps of:

(a) receiving a signal indicative of an instruction for starting a basic game given by a player;

(b) displaying a plurality of symbols used for the basic game dynamically;

(c) terminating the step (b) and displaying the symbols statically;

(d) determining whether or not the symbols statically displayed is entitled to a bonus game;

(e) controlling a transition from a basic game to the bonus game if the step (d) determines that the symbols are entitled to the bonus game;

(f) displaying an image of a character and a plurality of images of selectable elements;

(g) controlling a display of the slot machine to operate as a touch panel;

(h) executing a lottery to select one of first and second bonus game items with a selectable element selected by the player via the touch panel;

(i) controlling the display to display an image indicating one of the first and second bonus game items in accordance with the outcome of the lottery executed in the step (h); and (j) providing one of first and second payouts to the player in accordance with the outcome of the lottery executed in the step (h).

* * * * *